US012612525B2

(12) United States Patent
Jana

(10) Patent No.: US 12,612,525 B2
(45) Date of Patent: Apr. 28, 2026

(54) AMINE COMPOUND, REACTIVE COALESCING AGENT, COATING COMPOSITION, COATING LAYER AND RELATED METHODS

(71) Applicant: Agency for Science, Technology and Research, Singapore (SG)

(72) Inventor: Satyasankar Jana, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 931 days.

(21) Appl. No.: 17/778,922

(22) PCT Filed: Jan. 22, 2021

(86) PCT No.: PCT/SG2021/050034
§ 371 (c)(1),
(2) Date: May 23, 2022

(87) PCT Pub. No.: WO2021/150170
PCT Pub. Date: Jul. 29, 2021

(65) Prior Publication Data
US 2023/0044488 A1 Feb. 9, 2023

(30) Foreign Application Priority Data
Jan. 23, 2020 (SG) ............................ 10202000682P

(51) Int. Cl.
*C09D 7/63* (2018.01)
*C09D 201/08* (2006.01)

(52) U.S. Cl.
CPC ............. *C09D 7/63* (2018.01); *C09D 201/08* (2013.01)

(58) Field of Classification Search
CPC ........ C09D 201/08; C09D 5/024; C08K 5/17; C07C 229/14
USPC .......................................................... 562/442
See application file for complete search history.

(56) References Cited

U.S. PATENT DOCUMENTS 5,565,290 A 10/1996 Itakura et al.
2013/0143986 A1 6/2013 Luebke et al.

FOREIGN PATENT DOCUMENTS

WO WO 2017/171665 10/2017

OTHER PUBLICATIONS

International Search Report and Written Opinion in International Appication No. PCT/SG2021/050034, dated Apr. 1, 2021, 10 pages.
Islam et al., "Poly(hydroxamic acid) functionalized copper catalyzed C—N bond formation reactions," RSC Advances., Jun. 6, 2016, 6(61):56450-56457.
Database Registry, Chemical Abstracts Services, [retrieved on May 20, 2022] 5 pages CAS Registry No. 102753-61-7, Entered Date: Jun. 21, 1986 CAS Registry No. 1387232-21-4, Entered Date: Jul. 8, 2012 CAS Registry No. 1092525-51-3, Entered Date: May 1, 2009.

*Primary Examiner* — Ana Z Muresan
(74) *Attorney, Agent, or Firm* — Fish & Richardson P.C.

(57) ABSTRACT

There is provided a reactive coalescing agent for a coating formulation that is substantially free from volatile organic compounds (VOCs), the coalescing agent comprising one or more amine compounds represented by general formula (I). Also provided are a coating composition, a coating layer, a method of preparing said reactive coalescing agent and a method of preparing said coating layer.

(I)

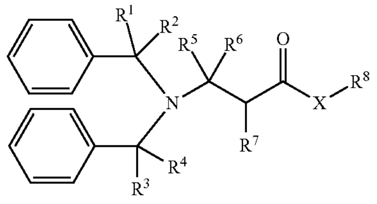

22 Claims, 18 Drawing Sheets

Formulation C1 (YS800AP + ACA4 + $TiO_2$)

(i) Before exposure (ii) After 100 hours of exposure

Technical features/advantages of amine based coalescing agents designed in accordance with various embodiments disclosed herein Structure of ACAs, boiling point (b.p.) and volatility results

| No. | Code | Structure | b.p. (°C) | Volatility, % wt loss@110 °C, 1h |
|---|---|---|---|---|
| 1 | ACA4 |  | 293 | 3.6 |
| 2 | ACA5 |  | 294 | 1.6 |
| 3 | ACA6 |  | 358 | 3.0 |
| 4 | ACA7 |  | 346 | 0.1 |
| 5 | ACA8 |  | 267 | 8.9 |
| 6 | ACA16 |  | 350 | 9.8 |
| 7 | ACA15 |  | 254 | 9.5 |
| 8 | ACA13 |  | 298 | 9.7 |

AMINE COMPOUND, REACTIVE COALESCING AGENT, COATING COMPOSITION, COATING LAYER AND RELATED METHODS

CROSS-REFERENCE TO RELATED APPLICATIONS

This application is a U.S. National Phase application under 35 U.S.C. § 371 of International Patent Application No. PCT/SG2021/050034, filed on Jan. 22, 2021, which claims priority to Singapore patent application Ser. No. 10202000682P, filed on Jan. 23, 2020, the entire contents of which are incorporated herein by reference.

TECHNICAL FIELD

The present disclosure relates broadly to a reactive coalescing agent for a coating formulation that is substantially free from volatile organic compounds (VOCs), a coating composition and a coating layer. The present disclosure also relates to methods of preparing said reactive coalescing agent and said coating layer.

BACKGROUND

With increasing environmental awareness, many industries are searching for greener methods and materials that may reduce impact on the environment. In recent years, one successful industrial approach for making surface coatings with low environmental impact is adopting water-based technology such as using waterborne formulations instead of solvent based formulations. Indeed, waterborne coatings are widely used in architectural and industrial coatings, and paper coatings etc. As water is the main medium, emissions from waterborne coatings are significantly lesser as compared to solvent based coatings.

However, currently available waterborne coatings still contain a substantial amount (about 2-10%) of volatile organic compounds (VOCs). VOCs are compounds with high vapor pressures that volatilize easily into the atmosphere and can have detrimental effects on the environment and human health. One of the main sources of VOCs in waterborne coating formulations is coalescing agents, which are typically added to enhance film formation (by decreasing glass transition temperature (Tg) or minimum film formation temperature (MFFT) of the film forming polymer and increasing polymer chain diffusion during coating drying process). In currently available coating formulations, the conventional coalescing agent contained within evaporates as soon as the formulation is dried to form a coating, which eventually ends up in the environment.

Research and development are ongoing with the aim of reducing VOCs emissions from coating formulations but to date, the search for a suitable method or material to effectively reduce or completely eliminate VOCs emissions from coating formulations remains futile.

There have been discussions on methods to reduce the use of coalescing agents or on alternative materials to replace conventional coalescing agents in coating formulations. However, these studies are faced with various challenges. In particular, the coalescing agent plays an important role in film formation and cannot be easily reduced or substituted with any other ingredient. Furthermore, several considerations must be taken into account when adjusting or changing components in the coating formulations to ensure that the required properties of a coating formulation such as stability, compatibility and film formation ability are not compromised.

In view of the above, there is a need to address or at least ameliorate the above-mentioned problems. In particular, there is a need to provide a coalescing agent for a coating formulation that is substantially free from volatile organic compounds (VOCs), a coating composition, a coating layer and related methods that address or at least ameliorate the above-mentioned problems.

SUMMARY

In one aspect, there is provided a coalescing agent for a coating formulation that is substantially free from volatile organic compounds (VOCs), the coalescing agent comprising one or more amine compounds represented by general formula (I):

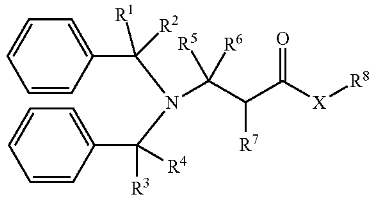

(I)

wherein

X is selected from O and NH;

$R^1$, $R^2$, $R^3$ and $R^4$ are each independently selected from H, alkyl and alkenyl;

$R^5$, $R^6$ and $R^7$ are H;

$R^8$ is selected from alkyl, alkenyl, cycloalkyl, cycloalkenyl, alkylhydroxy, hydroxyalkyl, oxy, alkyloxyalkyl, $(alkyloxy)_n$alkyl where n≥1, alkylacrylate, alkyl(meth)acrylate, alkylacrylamide, alkylamine or $(alkyloxy)_m$alkyl-O—C(═O)-alkylamine where m≥0 and wherein one or more of the H atoms is/are optionally replaced by hydroxy, alkoxy, hydroxyalkyl, halogen, haloalkyl, cyano, cyanoalkyl and nitro.

In one embodiment, $R^8$ is selected from alkyl, alkenyl, cycloalkyl, cycloalkenyl, alkylhydroxy, hydroxyalkyl, oxy, alkyloxyalkyl, $(alkyloxy)_n$alkyl where n≥1, alkylacrylate, alkyl(meth)acrylate or alkylacrylamide.

In one embodiment, the amine compound has a boiling point that is more than about 250° C.

In one embodiment, $R^1$, $R^2$, $R^3$ and $R^4$ are each independently selected from the group consisting of H, linear or branched $(C_1-C_{10})$-alkyl and linear or branched $(C_1-C_{10})$-alkenyl.

In one embodiment, $R^8$ is selected from linear or branched $(C_1-C_{30})$-alkyl, linear or branched $(C_2-C_{30})$-alkenyl, $(C_3-C_{30})$-cycloalkyl, $(C_3-C_{30})$-cycloalkenyl, linear or branched $(C_1-C_{30})$-alkylhydroxy, linear or branched hydroxy-$(C_1-C_{30})$-alkyl, linear or branched $(C_1-C_{30})$-alkyl-oxy-$(C_1-C_{30})$-alkyl, linear or branched $[(C_1-C_{30})\text{-alkyl-oxy}]_n$-$(C_1-C_{30})$-alkyl where n≥1, $(C_1-C_{30})$-alkyl-acrylate, $(C_1-C_{30})$-alkyl-(meth)acrylate, $(C_1-C_{30})$-alkyl-acrylamide, linear or branched $(C_1-C_{30})$-alkylamine, or $[(C_1-C_{30})\text{-alkyl-oxy})_m$-$(C_1-C_{30})$-alkyl-O—C(═O)—$(C_1-C_{30})$-alkylamine where m≥0.

In one embodiment, $R^8$ is selected from linear or branched $(C_1-C_{30})$-alkyl, linear or branched $(C_2-C_{30})$-alkenyl, $(C_3-C_{30})$-cycloalkyl, $(C_3-C_{30})$-cycloalkenyl, linear or branched ($C_1$-$C_{30}$)-alkylhydroxy, linear or branched hydroxy-($C_1$-$C_{30}$)-alkyl, linear or branched ($C_1$-$C_{30}$)-alkyl-oxy-($C_1$-$C_{30}$)-alkyl, linear or branched $[(C_1\text{-}C_{30})\text{-alkyl-oxy}]_n$-($C_1$-$C_{30}$)-alkyl where n≥1, ($C_1$-$C_{30}$)-alkyl-acrylate, ($C_1$-$C_{30}$)-alkyl-(meth)acrylate or ($C_1$-$C_{30}$)-alkyl-acrylamide.

In one embodiment, $R^8$ is selected from one of the following:

—$R^9$—OH;

—$R^{10}$;

—$(R^{11}—O)_n—R^{12}$;

—$R^{13}$—O—C(═O)—C($CH_3$)═$CH_2$;

—$R^{14}$(OH)—$R^{15}$—O—C(═O)—C($CH_3$)═$CH_2$;

—$R^{16}$—$NR^xR^y$; or

—$(R^{17}—O)_m—R^{18}$—O—C(═O)—$R^{19}$—$NR^xR^y$, where n≥1, m≥0, $R^9$ to $R^{19}$ are each alkyl, and where $R^x$ and $R^y$ are each independently selected from H, alkyl, alkenyl, cycloalkyl, cycloalkenyl, aryl and alkylaryl.

In one embodiment, $R^8$ is selected from one of the following:

—$R^9$—OH;

—$R^{10}$;

—$(R^{11}—O)_n—R^{12}$;

—$R^{13}$—O—C(═O)—C($CH_3$)═$CH_2$; or

—$R^{14}$(OH)—$R^{15}$—O—C(═O)—C($CH_3$)═$CH_2$, where n≥1 and $R^9$ to $R^{15}$ are each alkyl.

In one embodiment, $R^8$ is (i) hydroxyalkyl selected from the group consisting of hydroxymethyl, hydroxyethyl, 2-hydroxyethyl hydroxypropyl, 2-hydroxypropyl, hydroxybutyl, hydroxypentyl and hydroxyhexyl; (ii) $(\text{alkyloxy})_n$alkyl selected from the group consisting of methoxymethyl, methoxyethyl, methoxypropyl, methoxybutyl, ethoxymethyl, ethoxyethyl, ethoxypropyl, ethoxybutyl, propoxymethyl, propoxyethyl, propoxypropyl, propoxybutyl, methoxymethoxymethyl, methoxymethoxyethyl, methoxymethoxypropyl, methoxymethoxybutyl, ethoxyethoxymethyl, ethoxyethoxyethyl, ethoxyethoxypropyl, ethoxyethoxybutyl, propoxypropoxymethyl, propoxypropoxyethyl, propoxypropoxypropyl, propoxypropoxybutyl, methoxymethoxymethoxymethyl, methoxymethoxymethoxyethyl, methoxymethoxymethoxypropyl, methoxymethoxymethoxybutyl, ethoxyethoxyethoxymethyl, ethoxyethoxyethoxyethyl, ethoxyethoxyethoxypropyl, ethoxyethoxyethoxybutyl, propoxypropoxypropoxymethyl, propoxypropoxypropoxyethyl, propoxypropoxypropoxypropyl and propoxypropoxypropoxybutyl; (iii) alkyl(meth)acrylate selected from the group consisting of methyl (meth)acrylate, ethyl (meth) acrylate, propyl (meth)acrylate, isopropyl (meth)acrylate, n-butyl (meth)acrylate, isobutyl (meth)acrylate, 3-methylbutyl (meth)acrylate, amyl (meth)acrylate, neopentyl (meth) acrylate, hexyl (meth)acrylate, cyclohexyl (meth)acrylate, heptyl (meth)acrylate, n-octyl (meth)acrylate, ethylhexyl (meth)acrylate and decyl (meth)acrylate; or (iv) alkyl(meth) acrylate substituted with hydroxy that is selected from the group consisting of hydroxymethyl (meth)acrylate, hydroxyethyl (meth)acrylate, hydroxypropyl (meth)acrylate and hydroxybutyl (meth)acrylate.

In one embodiment, $R^1$, $R^2$, $R^3$ and $R^4$ are all H atoms.

In one embodiment, the amine compound comprises more than twelve carbon atoms per basic nitrogen atom.

In one embodiment, the coalescing agent is configured to spontaneously react with a polymer in a coating composition during/upon drying to form a coating layer.

In one embodiment, the coalescing agent is configured to form a chemical interaction with the polymer during/upon drying, wherein the chemical interaction is at least one of an ionic interaction or a covalent interaction.

In one embodiment, the amine compound is selected from the following compounds (1) to (8):

(1)

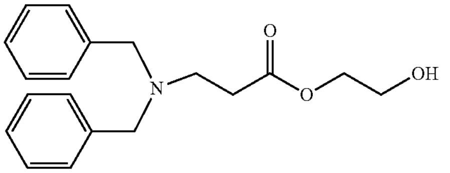

(2)

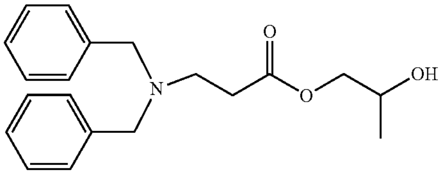

(3)

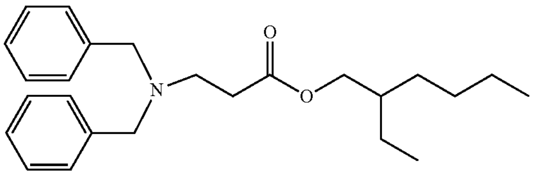

(4)

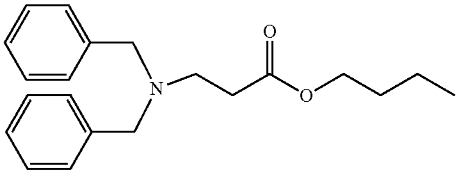

(5)

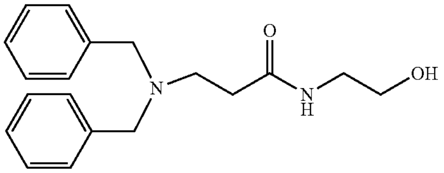

(6)

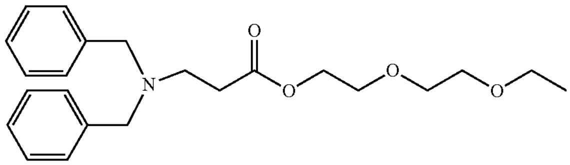

(7)

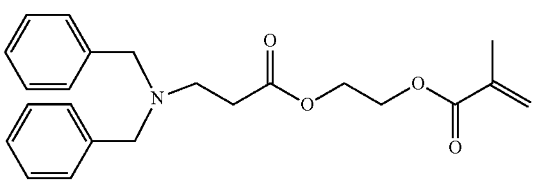

(8)

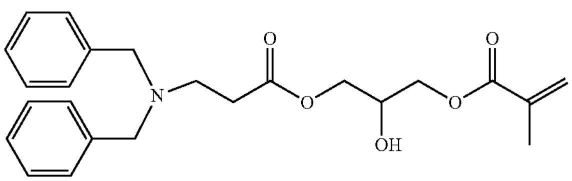

In one embodiment, the amine compound is selected from the following compounds (9) to (12):

(9)

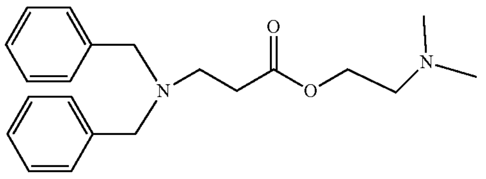

(10)

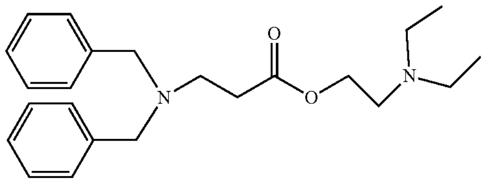

(11)

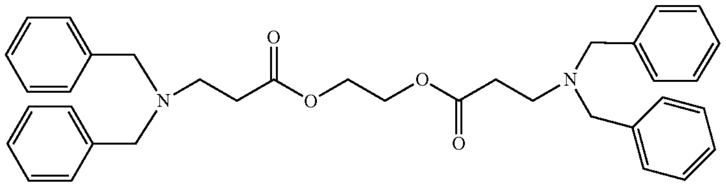

(12)

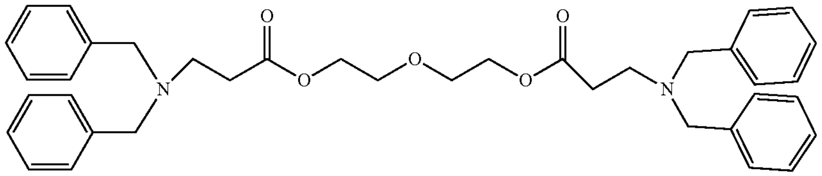

In one aspect, there is provided a coating composition comprising one or more coalescing agent(s) disclosed herein and one or more polymer(s) configured to spontaneously react with the coalescing agent(s) during/upon drying of the coating composition to form a coating layer.

In one embodiment, the polymer comprises one or more acid group(s) and/or salts thereof selected from carboxylic acids (—C(═O)OH)), sulfonic acids (—S(═O)$_2$OH), phosphonic acids (—P(═O)(OH)$_2$), amine neutralized carboxylic acids, amine neutralized sulfonic acids, amine neutralized phosphonic acids, carboxylic acid-amine salts, sulfonic acid-amine salts and phosphonic acid-amine salts.

In one embodiment, the carboxylic acids and derivatives thereof comprises acrylic acid and derivatives thereof; methacrylic acid and derivatives thereof; maleic acid and derivatives thereof; itaconic acid and derivatives thereof and combinations thereof.

In one embodiment, the amount of the coalescing agent in the composition is from about 0.2 wt % to about 20.0 wt % of the composition.

In one embodiment, the coating composition is substantially devoid of volatile organic compounds (VOCs).

In one embodiment, the coating composition is a water-based coating composition.

In one embodiment, the coating composition is a water-based paint coating composition.

In one aspect, there is provided a coating layer comprising one or more coalescing agent(s) disclosed herein chemically coupled to one or more polymer(s) via at least one of an ionic interaction or a covalent interaction.

In one embodiment, the layer has one or more of the following properties: odourless, non-tacky, non-sticky, substantially colourless in solution, substantially insoluble in water, substantially do not blister in water, substantially do not delaminate in water, chemically and/or physically stable, excellent resistance towards natural exposure/weathering and substantially inert towards ultraviolet (UV) light.

Definitions

The term "coalescing agent" is to be interpreted broadly to refer to any agent that improves particle coalescence and/or facilitates the formation of a film by temporarily plasticizing (e.g., softening) the polymer particles. The term "coalescing agent" may be used interchangeably or alternatively termed as "plasticizer".

The term "bond" refers to a linkage between atoms in a compound or molecule. The bond may be a single bond, a double bond, or a triple bond.

In the definitions of a number of substituents below, it is stated that "the group may be a terminal group or a bridging group". This is intended to signify that the use of the term is intended to encompass the situation where the group is a terminal group/moiety as well as the situation where the group is a linker between two other portions of the molecule. Using the term "alkyl" having 1 carbon atom as an example, it will be appreciated that when existing as a terminal group, the term "alkyl" having 1 carbon atom may mean —$CH_3$ and when existing as a bridging group, the term "alkyl" having 1 carbon atom may mean —$CH_2$— or the like.

The term "amine group" or the like is intended to broadly refer to a group containing —$NR_2$, where R is independently a hydrogen or an organic group. The group may be a terminal group or a bridging group.

The term "alkyl" as a group or part of a group refers to a straight or branched aliphatic hydrocarbon group having 1 to 50 carbon atoms, 1 to 45 carbon atoms, 1 to 40 carbon atoms, 1 to 35 carbon atoms, 1 to 30 carbon atoms, 1 to 20 carbon atoms, 1 to 10 carbon atoms, 1 to 6 carbon atoms, or 1, 2, 3, 4, 5, 6, 7, 8, 9, 10, 11, 12, 13, 14, 15, 16, 17, 18, 19 or 20 carbon atoms. Examples of suitable straight and branched alkyl substituents include methyl, ethyl, n-propyl, 2-propyl, isopropyl, n-butyl, isobutyl, sec-butyl, t-butyl, hexyl, amyl, 1,2-dimethylpropyl, 1,1-dimethylpropyl, pentyl, isopentyl, hexyl, 4-methylpentyl, 1-methylpentyl, 2-methylpentyl, 3-methylpentyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, 2-ethylpentyl, 3-ethylpentyl, heptyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3-trimethylbutyl, 1,1,2-trimethylbutyl, 1,1,3-trimethylbutyl, 5-methylheptyl, 1-methylheptyl, octyl, nonyl, decyl and the like. The group may be a terminal group or a bridging group.

The term "alkenyl" as a group or part of a group denotes an aliphatic hydrocarbon group containing at least one carbon-carbon double bond and which may be straight or branched having 2 to 50 carbon atoms, 2 to 45 carbon atoms, 2 to 40 carbon atoms, 2 to 35 carbon atoms, 2 to 30 carbon atoms, 2 to 20 carbon atoms, 2 to 10 carbon atoms, 2 to 6 carbon atoms, or 2, 3, 4, 5, 6, 7, 8, 9, 10, 11, 12, 13, 14, 15, 16, 17, 18, 19 or 20 carbon atoms in the chain. The group may contain a plurality of double bonds and the orientation about each double bond is independently E or Z. Exemplary alkenyl groups include, but are not limited to, ethenyl, vinyl, allyl, 1-methylvinyl, 1-propenyl, 2-propenyl, 2-methyl-1-propenyl, 2-methyl-1-propenyl, 1-butenyl, 2-butenyl, 3-butentyl, 1,3-butadienyl, 1-pentenyl, 2-pententyl, 3-pentenyl, 4-pentenyl, 1,3-pentadienyl, 2,4-pentadienyl, 1,4-pentadienyl, 3-methyl-2-butenyl, 1-hexenyl, 2-hexenyl, 3-hexenyl, 1,3-hexadienyl, 1,4-hexadienyl, 2-methylpentenyl, 1-heptenyl, 2-heptentyl, 3-heptenyl, 1-octenyl, 2-octenyl, 3-octenyl, 1-nonenyl, 2-nonenyl, 3-nonenyl, 1-decenyl, 2-decenyl, 3-decenyl and the like. The group may be a terminal group or a bridging group.

The term "cycloalkyl" as used herein broadly refers to a structure where carbon atoms are connected to form at least one ring and having 3 to 50 carbon atoms, 3 to 45 carbon atoms, 3 to 40 carbon atoms, 3 to 35 carbon atoms, 3 to 30 carbon atoms, 3 to 20 carbon atoms, 3 to 10 carbon atoms, 3 to 6 carbon atoms, or 3, 4, 5, 6, 7, 8, 9, 10, 11, 12, 13, 14, 15, 16, 17, 18, 19 or 20 carbon atoms in the substituent. The term includes, but is not limited to, 3-membered, 4-membered, 5-membered, and 6-membered rings. Examples of cycloalkyl substituents include, but are not limited to cyclopropyl, cyclobutyl, cyclopentyl, cyclohexyl, cycloheptyl, cyclooctyl, cyclononyl and the like. The group may be a terminal group or a bridging group.

The term "cycloalkenyl" as used herein broadly refers to a structure where carbon atoms are connected to form at least one ring, where the ring contains at least one carbon-carbon double bond, and having 3 to 50 carbon atoms, 3 to 45 carbon atoms, 3 to 40 carbon atoms, 3 to 35 carbon atoms, 3 to 30 carbon atoms, 3 to 20 carbon atoms, 3 to 10 carbon atoms, 3 to 6 carbon atoms, or 3, 4, 5, 6, 7, 8, 9, 10, 11, 12, 13, 14, 15, 16, 17, 18, 19 or 20 carbon atoms in the substituent. The term includes, but is not limited to, 3-membered, 4-membered, 5-membered, and 6-membered rings. Examples of cycloalkenyl substituents include, but are not limited to cyclopropenylidene, cyclobutenyl, cyclopentyl, cyclohexenyl, cycloheptenyl, cyclooctenyl and the like. The group may be a terminal group or a bridging group.

The term "alkylhydroxy" or "hydroxyalkyl" as used herein is intended to broadly refer to a group containing —R—OH, where R is alkyl as defined herein.

The group may be a terminal group or a bridging group. Examples include hydroxymethyl, hydroxyethyl, 2-hydroxyethyl hydroxypropyl, 2-hydroxypropyl, hydroxybutyl, hydroxypentyl, hydroxyhexyl and the like.

The term "oxy" as used herein is intended to broadly refer to a group containing —O—.

The term "alkyloxyalkyl" as used herein is intended to broadly refer to a group containing —R—O—R', where R and R' are alkyl as defined herein. The group may be a terminal group or a bridging group.

The term "(alkyloxy)$_n$alkyl" as used herein is intended to broadly refer to a group containing —(R—O)$_n$—R', where R and R' are alkyl as defined herein. The group may be a terminal group or a bridging group.

The term "alkylacrylate" as used herein is intended to broadly refer to a group containing —R—O—C(═O)—CH═$CH_2$, where R is alkyl as defined herein. The group may be a terminal group or a bridging group.

The term "alkyl(meth)acrylate" as used herein is intended to broadly refer to a group containing —R—O—C(═O)—C(═$CH_2$)—$CH_3$, where R is alkyl as defined herein. The group may be a terminal group or a bridging group.

The term "alkylacrylamide" as used herein is intended to broadly refer to a group containing —R—NH—C(═O)—CH═$CH_2$, where R is alkyl as defined herein.

The group may be a terminal group or a bridging group.

The term "alkylamine" as used herein is intended to broadly refer to a group containing —R—$NR^xR^y$, where R is alkyl as defined herein and where $R^x$ and $R^y$ are each independently selected from a hydrogen or an organic group. Examples of organic group include, but are not limited to alkyl (e.g., methyl, ethyl, propyl, t-butyl), alkenyl, cycloalkyl, cycloalkenyl, aryl, alkylaryl and the like. The amine may be a primary amine, a secondary amine or a tertiary amine.

The term "aryl" as used herein is intended to broadly refer to hydrocarbons having a ring-shaped or cyclic structure with delocalised electrons between carbon atoms. Examples of aryl substituents include, but are not limited to benzene, furan, thiophene, pyrrole, pyrazole, imidazole, oxazole, thiazole, triazole, oxadiazole, thiadiazole, tetrazole, benzofuran, benzothiophene, benzopyrrole, benzodifuran, benzodithiophene, benzodipyrrole, pyridine, pyridazine, pyrimidine, pyrazine, 1,2,3-triazine, 1,2,4-triazine, 1,3,5-triazine and the like.

The term "alkylaryl" as used herein is intended to broadly refer to a group containing —R—Y—, where R is alkyl as defined herein and Y is aryl as defined herein. The group may be a terminal group or a bridging group.

The term "hydroxy" as used herein is intended to broadly refer to a group containing —OH.

The term "alkoxy" as used herein refers to straight chain or branched alkyloxy groups. Examples include methoxy, ethoxy, n-propoxy, isopropoxy, tert-butoxy, and the like.

The term "halogen" represents chlorine, fluorine, bromine or iodine. The term "halo" represents chloro, fluoro, bromo or iodo. The term "haloalkyl" as used herein is intended to broadly refer to a group containing —R—X, where R is alkyl as defined herein and X is halogen as defined herein. The group may be a terminal group or a bridging group.

The term "cyano" as used herein is intended to broadly refer to a group containing —CN. The term "cyanoalkyl" as used herein is intended to broadly refer to a group containing —R—CN, where R is alkyl as defined herein. The group may be a terminal group or a bridging group.

The term "nitro" as used herein is intended to broadly refer to a group containing —$NO_2$.

The term "carbonyl" as used herein is intended to broadly refer to a group containing —C(═O)—.

The term "oxycarbonyl" as used herein is intended to broadly refer to a group containing —O—C(═O)—.

The term "carboxyl" as used herein is intended to broadly refer to a group containing —C(═O)—O—R, where R is hydrogen or an organic group.

The term "amide group" or the like is intended to broadly refer to a group containing —C(═O)$NR_2$, where R is independently a hydrogen or an organic group. The group may be a terminal group or a bridging group.

The term "optionally substituted," when used to describe a chemical structure or moiety, refers to the chemical structure or moiety wherein one or more of its hydrogen atoms is optionally substituted with a chemical moiety or functional group such as alcohol, alkoxy, alkanoyloxy, alkoxycarbonyl, alkenyl, alkyl (e.g., methyl, ethyl, propyl, t-butyl), alkynyl, alkylcarbonyloxy (—OC(O)alkyl), amide (—C(O)NH-alkyl- or -alkylNHC(O)alkyl), amine (such as alkylamino, arylamino, arylalkylamino), aryl, aryloxy, azo, carbamoyl (—NHC(O)O-alkyl- or —OC(O)NH-alkyl), carbamyl (e.g., $CONH_2$, as well as CONH-alkyl, CONH-aryl, and CONH-arylalkyl), carboxyl, carboxylic acid, cyano, ester, ether (e.g., methoxy, ethoxy), halo, haloalkyl (e.g., —$CCl_3$, —$CF_3$, —$C(CF_3)_3$), heteroalkyl, isocyanate, isothiocyanate, nitrile, nitro, phosphodiester, sulfide, sulfonamido (e.g., $SO_2NH_2$), sulfone, sulfonyl (including alkylsulfonyl, arylsulfonyl and arylalkylsulfonyl), sulfoxide, thiol (e.g., sulfhydryl, thioether) or urea (—NHCONH-alkyl-).

The term "substantially free" as used herein is to be understood to be less than about 2 weight percent, no more than about 1 weight percent, no more than about 0.5 weight percent, no more than about 0.15 weight percent, no more than about 0.05 or no more 0.01 weight percent of the undesired component. The term may also encompass "completely free," "entirely free," or "free" which may be understood to mean an absence of, i.e., less than an analytically detectable amount, of the undesired component(s).

The term "micro" as used herein is to be interpreted broadly to include dimensions from about 1 micron to about 1000 microns.

The term "nano" as used herein is to be interpreted broadly to include dimensions less than about 1000 nm, less than about 500 nm, less than about 100 nm or less than about 50 nm.

The terms "coupled" or "connected" as used in this description are intended to cover both directly connected or connected through one or more intermediate means, unless otherwise stated.

The term "associated with", used herein when referring to two elements refers to a broad relationship between the two elements. The relationship includes, but is not limited to a physical, a chemical or a biological relationship.

For example, when element A is associated with element B, elements A and B may be directly or indirectly attached to each other or element A may contain element B or vice versa.

The term "adjacent" used herein when referring to two elements refers to one element being in close proximity to another element and may be but is not limited to the elements contacting each other or may further include the elements being separated by one or more further elements disposed there between.

The term "and/or", e.g., "X and/or Y" is understood to mean either "X and Y" or "X or Y" and should be taken to provide explicit support for both meanings or for either meaning.

Further, in the description herein, the word "substantially" whenever used is understood to include, but not restricted to, "entirely" or "completely" and the like. In addition, terms such as "comprising", "comprise", and the like whenever used, are intended to be non-restricting descriptive language in that they broadly include elements/components recited after such terms, in addition to other components not explicitly recited. For example, when "comprising" is used, reference to a "one" feature is also intended to be a reference to "at least one" of that feature. Terms such as "consisting", "consist", and the like, may in the appropriate context, be considered as a subset of terms such as "comprising", "comprise", and the like. Therefore, in embodiments disclosed herein using the terms such as "comprising", "comprise", and the like, it will be appreciated that these embodiments provide teaching for corresponding embodiments using terms such as "consisting", "consist", and the like. Further, terms such as "about", "approximately" and the like whenever used, typically means a reasonable variation, for example a variation of +/−5% of the disclosed value, or a variance of 4% of the disclosed value, or a variance of 3% of the disclosed value, a variance of 2% of the disclosed value or a variance of 1% of the disclosed value.

Furthermore, in the description herein, certain values may be disclosed in a range. The values showing the end points of a range are intended to illustrate a preferred range. Whenever a range has been described, it is intended that the range covers and teaches all possible sub-ranges as well as individual numerical values within that range. That is, the end points of a range should not be interpreted as inflexible limitations. For example, a description of a range of 1% to 5% is intended to have specifically disclosed sub-ranges 1% to 2%, 1% to 3%, 1% to 4%, 2% to 3% etc., as well as individually, values within that range such as 1%, 2%, 3%, 4% and 5%. It is to be appreciated that the individual numerical values within the range also include integers, fractions and decimals. Furthermore, whenever a range has been described, it is also intended that the range covers and teaches values of up to 2 additional decimal places or significant figures (where appropriate) from the shown numerical end points. For example, a description of a range of 1% to 5% is intended to have specifically disclosed the ranges 1.00% to 5.00% and also 1.0% to 5.0% and all their intermediate values (such as 1.01%, 1.02% . . . 4.98%, 4.99%, 5.00% and 1.1%, 1.2% . . . 4.8%, 4.9%, 5.0% etc.) spanning the ranges. The intention of the above specific disclosure is applicable to any depth/breadth of a range.

Additionally, when describing some embodiments, the disclosure may have disclosed a method and/or process as a particular sequence of steps. However, unless otherwise required, it will be appreciated that the method or process should not be limited to the particular sequence of steps disclosed. Other sequences of steps may be possible. The particular order of the steps disclosed herein should not be construed as undue limitations. Unless otherwise required, a method and/or process disclosed herein should not be limited to the steps being carried out in the order written. The sequence of steps may be varied and still remain within the scope of the disclosure.

Furthermore, it will be appreciated that while the present disclosure provides embodiments having one or more of the features/characteristics discussed herein, one or more of these features/characteristics may also be disclaimed in other alternative embodiments and the present disclosure provides support for such disclaimers and these associated alternative embodiments.

DESCRIPTION OF EMBODIMENTS

Exemplary, non-limiting embodiments of a coalescing agent for a coating formulation that is substantially free from volatile organic compounds (VOCs), a coating composition, a coating layer and related methods are disclosed hereinafter.

Coalescing Agent

There is provided a coalescing agent, coalescing aid or coalescent that is substantially free from volatile organic compounds (VOCs). In various embodiments, the terms coalescing agent, coalescing aid and coalescent may be interchangeably used. In various embodiments, the coalescing agent is suitable for use as a coating formulation or coating composition. The coating formulation/composition may be a water-based coating formulation/composition. In various embodiments, the coating formulation/composition may be used as a water-based paint coating formulation/composition.

In various embodiments, the coalescing agent comprises one or more amine compounds represented by general formula (I):

(I)

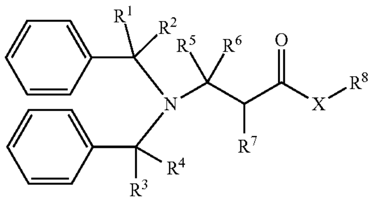

wherein

X is selected from O and NH;

$R^1$, $R^2$, $R^3$, $R^4$, $R^5$, $R^6$ and $R^7$ are each independently selected from H, alkyl and alkenyl;

$R^8$ is selected from alkyl, alkenyl, cycloalkyl, cycloalkenyl, alkylhydroxy, hydroxyalkyl, oxy, alkyloxyalkyl, $(alkyloxy)_n$alkyl where n≥1, alkylacrylate, alkyl(meth)acrylate, alkylacrylamide, alkylamine or $(alkyloxy)_m$alkyl-O—C(═O)-alkylamine where m≥0 and wherein one or more of the H atoms is/are optionally replaced by hydroxy, alkoxy, hydroxyalkyl, halogen, haloalkyl, cyano, cyanoalkyl and nitro.

In various embodiments, n is 1, 2, 3, 4, 5, 6, 7, 8, 9 or 10. In various embodiments, m is 0, 1, 2, 3, 4, 5, 6, 7, 8, 9 or 10.

In various embodiments, the amine compound represented by general formula (I) has a boiling point that is more than about 250° C., more than about 260° C., more than about 270° C., more than about 280° C., more than about 290° C., more than about 300° C., more than about 310° C., more than about 320° C., more than about 330° C., more than about 340° C., more than about 350° C., more than about 360° C., more than about 370° C., more than about 380° C., more than about 390° C., more than about 400° C., more than about 450° C. or more than about 500° C. In various embodiments, the amine compound has a boiling point that is at a temperature range of from about 250° C. to about 500° C. Advantageously, as the amine compound has a relatively high boiling point that is above about 250° C., the amine compound and/or coalescing agent does not volatilize easily (and escape into the atmosphere/environment), thereby preventing undesirable effects that may be caused by amine compounds entering the atmosphere/environment (e.g. causing pollution and becoming health hazards). Embodiments of the coalescing agent disclosed herein therefore overcome problems faced by conventional coalescing agents. In various embodiments, the amine compound is a low-volatile organic compound (i.e. low-VOC) or non-volatile organic compound (i.e. non-VOC). Advantageously, embodiments of the coalescing agents disclosed herein are no-VOC amine coalescing agents that can be used for the formulation of no/low-VOC (e.g. waterborne) coatings by simply replacing currently used coalescing agents (and without changing major coating components).

In various embodiments, the volatility or weight loss percentage (e.g. at about 110° C., about 1 h) of the amine compound represented by general formula (I) is less than about 20.0 wt %, less than about 15.0 wt %, less than about 10.0 wt %, less than about 9.0 wt %, less than about 8.0 wt %, less than about 7.0 wt %, less than about 6.0 wt %, less than about 5.0 wt %, less than about 4.0 wt %, less than about 3.0 wt %, less than about 2.0 wt %, less than about 1.0 wt %, less than about 0.9 wt %, less than about 0.8 wt %, less than about 0.7 wt %, less than about 0.6 wt %, less than about 0.5 wt %, less than about 0.4 wt %, less than about 0.3 wt %, less than about 0.2 wt %, less than about 0.1 wt %, less than about 0.05 wt % or less than about 0.01 wt %, measured at a temperature of between about 100° C. and about 110° C. over a duration of 1 hour. In various embodiments, the amine compound has a weight loss percentage that is from about 0.01 wt % to about 20.0 wt %, measured at a temperature of between about 100° C. and about 110° C. over a duration of 1 hour.

In various embodiments, the amine compound has a boiling point that is higher than commercial/conventional compounds. In various embodiments, the amine compound has a volatility lower than commercial/conventional compounds. The commercial/conventional compounds include, but are not limited to texanol (manufactured by Eastman), butyl carbitol (manufactured by Dow), propylene glycol phenyl ether (manufactured by Dow), 2-ethylhexyl benzoate (manufactured by Dow) and di(ethylene glycol) dibenzoate (manufactured by EK products).

In various embodiments, the number of carbon atoms present in $R^1$, $R^2$, $R^3$, $R^4$, $R^5$, $R^6$ and $R^7$ ranges from 0 to 10. In various embodiments, the number of carbon atoms present in $R^1$, $R^2$, $R^3$, $R^4$, $R^5$, $R^6$ or $R^7$ is 0, 1, 2, 3, 4, 5, 6, 7, 8, 9 or 10. In various embodiments, the number of carbon atoms present in $R^8$ ranges from 1 to 30. In various embodiments, the number of carbon atoms present in $R^8$ is 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30.

In various embodiments, $R^1$, $R^2$, $R^3$, $R^4$, $R^5$, $R^6$ and $R^7$ are each independently selected from H, linear or branched $(C_1\text{-}C_{10})$-alkyl and linear or branched $(C_1\text{-}C_{10})$-alkenyl. In various embodiments, $R^5$, $R^6$ and $R^7$ are all H atoms.

In various embodiments, the amine compound comprises a dibenzylamino core structure. The dibenzylamino core structure may be selected from dibenzylamino ester, dibenzylamino amide, or their derivatives thereof. In various embodiments, $R^1=R^2=R^3=R^4=H$.

In various embodiments, $R^1$, $R^2$, $R^3$, $R^4$, $R^5$, $R^6$ and $R^7$ are all H atoms.

In various embodiments, $R^8$ is selected from linear or branched $(C_1\text{-}C_{30})$-alkyl, linear or branched $(C_1\text{-}C_{30})$-alkenyl, $(C_3\text{-}C_{30})$-cycloalkyl, $(C_3\text{-}C_{30})$-cycloalkenyl, linear or branched $(C_1\text{-}C_{30})$-alkylhydroxy, linear or branched hydroxy-$(C_1\text{-}C_{30})$-alkyl, linear or branched $(C_1\text{-}C_{30})$-alkyloxy-$(C_1\text{-}C_{30})$-alkyl, linear or branched $[(C_1\text{-}C_{30})\text{-alkyloxy}]_n$-$(C_1\text{-}C_{30})$-alkyl where n≥1, $(C_1\text{-}C_{30})$-alkyl-acrylate, $(C_1\text{-}C_{30})$-alkyl-(meth)acrylate, $(C_1\text{-}C_{30})$-alkyl-acrylamide, linear or branched $(C_1\text{-}C_{30})$-alkylamine, or $[(C_1\text{-}C_{30})\text{-alkyloxy})_m$-$(C_1\text{-}C_{30})$-alkyl-O—C(═O)—$(C_1\text{-}C_{30})$-alkylamine where m≥0. The $C_1$-$C_{30}$ alkyl substituents may be straight or branched substituents selected from the group consisting of methyl, ethyl, n-propyl, 2-propyl, isopropyl, n-butyl, isobutyl, sec-butyl, t-butyl, hexyl, amyl, 1,2-dimethylpropyl, 1,1-dimethylpropyl, 2,2-dimethylpropyl, 1-ethylpropyl, 2-methylbutyl, 3-methylbutyl, n-pentyl, 2-pentyl, isopentyl, n-hexyl, 2-hexyl, 1-methylhexyl, 2-ethylhexyl, 1-methylpentyl, 2-methylpentyl, 3-methylpentyl, 4-methylpentyl, 1,1-dimethylbutyl, 2,2-dimethylbutyl, 2,3-dimethylbutyl, 3,3-dimethylbutyl, 1,2-dimethylbutyl, 1,3-dimethylbutyl, 1-ethylbutyl, 1-propylbutyl, 1,2,2-trimethylpropyl, 1,1,2-trimethylpropyl, 1-ethyl-2-methylpropyl, 2-ethylpentyl, 3-ethylpentyl, n-heptyl, 2-heptyl, 3-heptyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3-trimethylbutyl, 1,1,2-trimethylbutyl, 1,1,3-trimethylbutyl, 1-methylheptyl, 5-methylheptyl, 2-propylheptyl, octyl, nonyl, decyl and the like.

In various embodiments, $R^8$ is selected from hydroxyalkyl, (alkyloxy)$_n$alkyl, alkyl(meth)acrylate and alkyl(meth) acrylate substituted with hydroxy.

In various embodiments, $R^8$ is selected from one of the following: $—R^9—OH$; $—R^{10}$; $—(R^{11}—O)_n—R^{12}$; $—R^{13}—O—C(=O)—C(CH_3)=CH_2$; $—R^{14}(OH)—R^{15}—O—C(=O)—C(CH_3)=CH_2$; $—R^{16}—NR^xR^y$; or $—(R^{17}—O)_m—R^{18}—O—C(=O)—R^{19}—NR^xR^y$, where $n \geq 1$, $m \geq 0$, $R^9$ to $R^{19}$ are each alkyl, and where $R^x$ and $R^y$ are each independently selected from H, alkyl, alkenyl, cycloalkyl, cycloalkenyl, aryl and alkylaryl.

In various embodiments, $R^8$ is hydroxyalkyl. For example, in various embodiments, $R^8$ may be selected from hydroxymethyl, hydroxyethyl, 2-hydroxyethyl hydroxypropyl, 2-hydroxypropyl, hydroxybutyl, hydroxypentyl, hydroxyhexyl or the like.

In various embodiments, $R^8$ is (alkyloxy)$_n$alkyl. In various embodiments, n in (alkyloxy)alkyl ranges from 1 to 30. For example, in various embodiments, $R^8$ may be selected from methoxymethyl, methoxyethyl, methoxypropyl, methoxybutyl, ethoxymethyl, ethoxyethyl, ethoxypropyl, ethoxybutyl, propoxymethyl, propoxyethyl, propoxypropyl, propoxybutyl, methoxymethoxymethyl, methoxymethoxyethyl, methoxymethoxypropyl, methoxymethoxybutyl, ethoxyethoxymethyl, ethoxyethoxyethyl, ethoxyethoxypropyl, ethoxyethoxybutyl, propoxypropoxymethyl, propoxypropoxyethyl, propoxypropoxypropyl, propoxypropoxybutyl, methoxymethoxymethoxymethyl, methoxymethoxymethoxyethyl, methoxymethoxymethoxypropyl, methoxymethoxymethoxybutyl, ethoxyethoxyethoxymethyl, ethoxyethoxyethoxyethyl, ethoxyethoxyethoxypropyl, ethoxyethoxyethoxybutyl, propoxypropoxypropoxymethyl, propoxypropoxypropoxyethyl, propoxypropoxypropoxypropyl, propoxypropoxypropoxybutyl or the like.

In various embodiments, $R^8$ is alkyl(meth)acrylate. For example, in various embodiments, $R^8$ may be selected from methyl (meth)acrylate, ethyl (meth)acrylate, propyl (meth) acrylate, isopropyl (meth)acrylate, n-butyl (meth)acrylate, isobutyl (meth)acrylate, 3-methylbutyl (meth)acrylate, amyl (meth)acrylate, neopentyl (meth)acrylate, hexyl (meth)acrylate, cyclohexyl (meth)acrylate, heptyl (meth)acrylate, n-octyl (meth)acrylate, ethylhexyl (meth)acrylate, decyl (meth) acrylate or the like.

In various embodiments, $R^8$ is alkyl(meth)acrylate substituted with hydroxy. For example, in various embodiments, $R^8$ may be selected from hydroxymethyl (meth) acrylate, hydroxyethyl (meth)acrylate, hydroxypropyl (meth)acrylate, hydroxybutyl (meth)acrylate and the like. In some embodiments, the hydroxyalkyl(meth)acrylate is 2-hydroxypropyl methacrylate.

In various embodiments, $R^8$ is not ethyl. In various embodiments, $R^8$ is not butyl. In various embodiments, $R^8$ is not 2-ethylhexyl. In some embodiments, $R^8$ is not ethyl, butyl and/or 2-ethylhexyl.

In various embodiments, there are more than twelve carbon atoms per basic nitrogen atom in the compound. In various embodiments, there are at least 13, at least 14, at least 15, at least 16, at least 17, at least 18, at least 19, at least 20, at least 25, at least 30, at least 35, at least 40, at least 45 or at least 50 carbon atoms per nitrogen atom in the amine compound.

In various embodiments, the amine group(s) present in the compound is/are reactive. In various embodiments, the amine compound comprises single reactivity. Advantageously, due to the presence of a reactive site at the amine moiety, the coalescing agent comprising one or more amine compound(s) is capable of interacting/coupling with a polymer (e.g., a latex polymer). For example, an ionic interaction/coupling may occur at the reactive amine moiety of the amine compound. Even more advantageously, in various embodiments, as the coalescing agent comprising one or more amine compound(s) is held firmly in place by ionic interaction/coupling, the coalescing agent is prevented from being released into the atmosphere/environment.

In various embodiments, the amine compound comprises an additional functional group other than amine group(s). The additional functional group may be C═C bond or vinyl group, thereby imparting dual functionality to the amine compound. In various embodiments therefore, the amine compound comprises dual functionality or multiple functionality.

In various embodiments, the amine compound contains one C═C bond, two C═C bonds (diene), three C═C bonds (triene) or multiple C═C bonds (polyene). The amine compound may contain 1, 2, 3, 4, 5, 6, 7, 8, 9 or 10 C═C bonds.

In various embodiments, the amine group(s) and/or vinyl group(s) present in the compound is/are reactive. In various embodiments, both the amine group(s) and vinyl group(s) in the compound are reactive. In various embodiments, the amine compound comprises dual reactivity. Advantageously, due to the presence of two reactive sites, the coalescing agent comprising one or more amine compound(s) is capable of interacting/coupling with a polymer (e.g., a latex polymer) via two different types of interaction/coupling. For example, an ionic interaction/coupling may occur at the reactive amine moiety of the amine compound while a covalent interaction/coupling may occur at the reactive vinyl moiety of the same amine compound. In various embodiments, covalent interaction/coupling comprises polymerization such as free radical addition polymerization. Even more advantageously, in various embodiments, in addition to being held firmly in place by ionic interaction/coupling, the coalescing agent comprising one or more amine compound(s) undergoes free radical addition polymerization at the C═C moiety and forms a polymeric network where the coalescing agent is buried permanently (and therefore prevented from being released into the atmosphere/environment).

In various embodiments therefore, the coalescing agent is a reactive coalescing agent (due to the presence of one or more amine group(s) and optionally one or more vinyl group(s) in the coalescing agent).

In various embodiments, the coalescing agent is configured to spontaneously react with a polymer in a coating composition during/upon drying to form a coating layer. In various embodiments, the coalescing agent reacts with a polymer in the absence of a separate/external chemical/physical trigger or stimulus. Unlike conventional reactive coalescing agents which require external stimulus such as light or metal catalyst to work, embodiments of the coalescing agent disclosed herein do not require the presence of metal catalyst and/or oxygen and/or UV light and/or initiator in order to react/work. Embodiments of the coalescing agent therefore overcome problems faced by conventional reactive coalescing agents that require the use of an external stimulus such as light and metal catalyst. It will be appreciated that light is not easily accessible for applications such as interior coated surfaces and metal catalysts are generally toxic to work with. Advantageously, in various embodiments, the reaction between the coalescing agent and polymer is substantially devoid of metal catalyst and/or oxygen and/or UV light and/or initiator.

In various embodiments, the coalescing agent spontaneously reacts with a polymer in a coating composition to form a chemical interaction with the polymer during/upon drying. In various embodiments, the chemical interaction is at least one of an ionic interaction or a covalent interaction. The covalent interaction/coupling may comprise free radical polymerization such as free radical addition polymerization of C═C.

In various embodiments, the polymer comprises one or more acid group(s) and/or salts thereof. For example, the polymer comprises —C(═O)OH groups. In such embodiments, the coalescing agent is configured to form a chemical interaction with the polymer via an ionic interaction/coupling. In various embodiments, during/upon drying to form a coating layer, the coalescing agent is chemically coupled with the polymer in the coating composition via an ionic interaction/coupling between the acid functionality of the polymer and amine functionality of the amine compound, thereby forming ionic bonds/links between the amine compound and the polymer having one or more acid group(s). In various embodiments, the ionic interaction/coupling is an acid-amine ionic interaction/coupling.

In various embodiments, the polymer comprises one or more acid group(s) and/or salts thereof, and the coalescing agent comprises one or more amine group(s) and one or more vinyl group(s). In such embodiments, the coalescing agent (also dual reactive coalescing agent) may be configured to form chemical interactions with the polymer via both an ionic interaction/coupling and a covalent interaction/coupling. Firstly, in various embodiments, during/upon drying to form a coating layer, the coalescing agent is chemically coupled with the polymer in the coating composition via an ionic interaction/coupling between the acid functionality of the polymer and amine functionality of the amine compound, thereby forming ionic bonds/links between the amine compound and the polymer having one or more acid group(s). Next, in various embodiments, on aging of the coating layer, free radical(s) are produced in the polymer and the vinyl group (C═C)) of the coalescing agent undergoes free radical addition polymerization to form a polymeric network (thereby forming covalent bonds/links between the amine compound and the polymer).

In various embodiments, the coalescing agent has substantially the same chemical and/or physical properties/characteristics as a conventional coalescing agent, prior to forming ionic links/bonds with the polymer.

In various embodiments, the amine compound is selected from the following compounds (1) to (12):

(1)

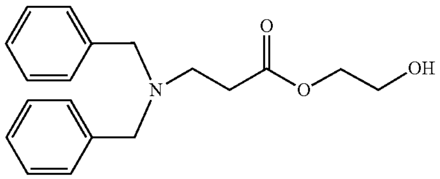

(2)

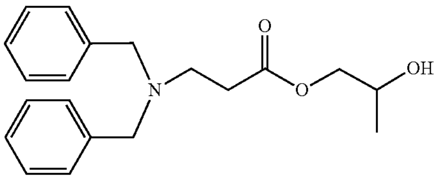

(3)

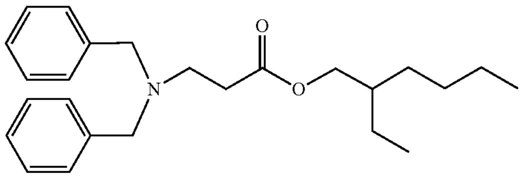

(4)

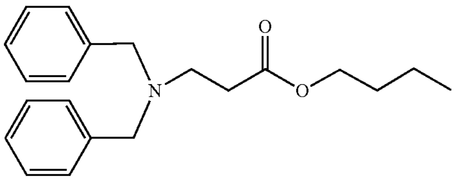

(5)

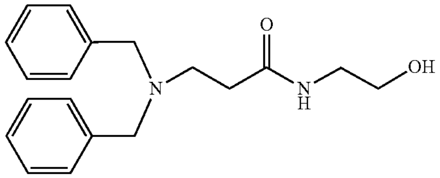

(6)

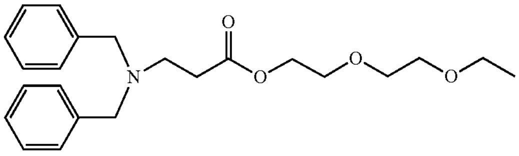

(7)

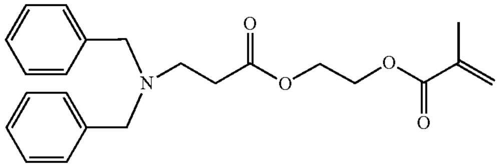

(8)

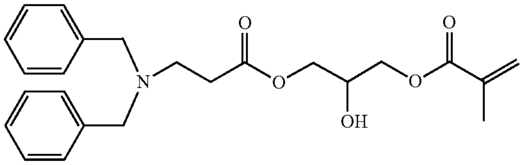

-continued (9)

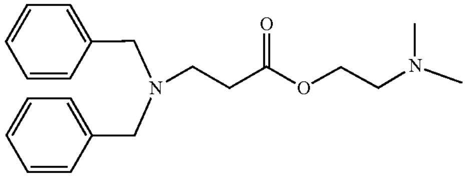

(10)

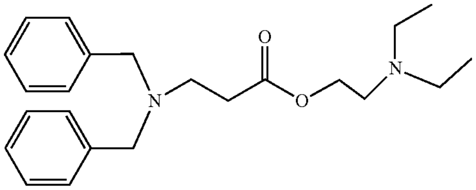

(11)

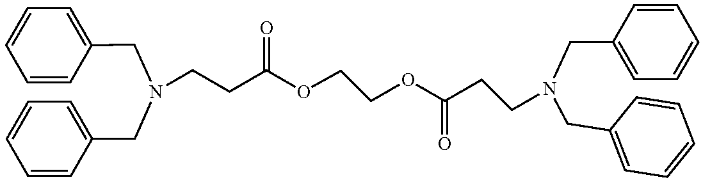

(12)

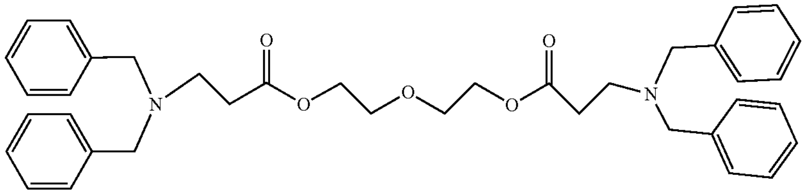

In various embodiments, the amine compound has a solubility percentage of no more than about 0.2%, no more than about 0.18%, no more than about 0.16%, no more than about 0.14%, no more than about 0.12%, no more than about 0.1%, no more than about 0.08%, no more than about 0.06%, no more than about 0.04%, no more than about 0.02%, no more than about 0.018%, no more than about 0.016%, no more than about 0.014%, no more than about 0.012%, no more than about 0.010%, no more than about 0.008%, no more than about 0.006%, no more than about 0.004%, no more than about 0.002% or no more than about 0.001% in water as measured at room temperature. In various embodiments, the amine compound has a solubility percentage of from about 0.2% to about 0.001% in water.

In various embodiments, the amine compound is hydrophobic or hydrophilic. In some embodiments, the amine compound is hydrophobic, substantially insoluble in water, and/or substantially immiscible with water. In other embodiments, the amine compound is hydrophilic, substantially soluble in water and/or substantially miscible in water.

In various embodiments, the amine compound has a solubility percentage of more than about 0.2%, more than about 0.4%, more than about 0.6%, more than about 0.8%, more than about 1%, more than about 2%, more than about 5%, more than about 10%, more than about 15%, more than about 20%, more than about 25%, more than about 30%, more than about 35%, more than about 40%, more than about 45%, more than about 50%, more than about 55%, more than about 60%, more than about 65%, more than about 70%, more than about 75%, more than about 80%, more than about 85%, more than about 90%, more than about 95% or more than about 99% in water as measured at room temperature.

Coating Composition

There is also provided a coating composition comprising one or more coalescing agent(s) as disclosed herein and one or more polymer(s) configured to spontaneously react with the coalescing agent(s) during/upon drying of the coating composition to form a coating layer. In various embodiments, the coalescing agent(s)/amine compound(s) are physically mixed with the polymer(s).

In various embodiments, the coalescing agent and polymer contain one or more features and/or share one or more properties that are similar to those described above.

In various embodiments, the polymer is a latex polymer or a binder polymer/polymeric binder/polymer binder. In various embodiments, the polymer is a waterborne polymer or a waterborne dispersed polymer or a solvent-free polymer. The polymer may be a waterborne latex polymer.

In various embodiments, the polymer comprises one or more acid group(s) and/or salts thereof selected from carboxylic acids (—C(═O)OH)), sulfonic acids (—S(═O)$_2$OH), phosphonic acids (—P(═O)(OH)$_2$), amine neutralized acids (such as amine neutralized carboxylic acids, amine neutralized sulfonic acids, amine neutralized phosphonic acids), and acid-amine salts (such as carboxylic acid-amine salts (—C(═O)O$^-$NH$_4^+$)), sulfonic acid-amine salts and phosphonic acid-amine salts). In various embodiments, the polymer comprises-C(═O)OH groups.

In various embodiments, the polymer comprises one or more different types of monomers selected from carboxylic acids and derivatives thereof. In various embodiments, the polymer comprising at least two different types of monomer, at least three different types of monomer, at least four different types of monomer, at least five different types of monomer or at least six different types of monomer. In various embodiments, the carboxylic acids and derivatives thereof comprises acrylic acid and derivatives thereof; methacrylic acid and derivatives thereof; maleic acid and derivatives thereof; itaconic acid and derivatives thereof and combinations thereof. In various embodiments, the acrylic acid derivative thereof comprises esters and amides (for e.g. N-methylolamides) of acrylic acid such as methyl acrylate, ethyl acrylate, butyl acrylate, 2-ethylhexyl acrylate (2EHA), N,N,dimethylacrylamide (NNDMA). In various embodiments, the methacrylic acid derivative thereof comprises esters and amides of methacrylic acid such as methyl (meth)acrylate, ethyl (meth)acrylate, propyl (meth)acrylate, isopropyl (meth)acrylate, butyl (meth)acrylate and (hydroxyethyl) methacrylate (HEMA).

In various embodiments, the amount/concentration of the coalescing agent in the composition is from about 0.2 wt % to about 20.0 wt %, from about 0.4 wt % to about 18.0 wt %, from about 0.6 wt % to about 16.0 wt %, from about 0.8 wt % to about 14.0 wt %, from about 1.0 wt % to about 12.0 wt %, from about 2.0 wt % to about 10.0 wt %, from about 4.0 wt % to about 8.0 wt %, from about 5.0 wt % to about 7.0 wt %, or about 6.0 wt % of the composition. Advantageously, in various embodiments, as only a low dosage of the coalescing agent may be required in the composition (e.g. paint formulation), there will be no significant issues with regard to colour and stability of the composition.

In various embodiments, the amount/concentration of the polymer in the composition is from about 80.0 wt % to about 99.8 wt %, from about 82.0 wt % to about 99.6 wt %, from about 84.0 wt % to about 99.4 wt %, from about 86.0 wt % to about 99.2 wt %, from about 88.0 wt % to about 99.0 wt %, from about 90.0 wt % to about 98.0 wt %, from about 92.0 wt % to about 96.0 wt %, or about 94.0 wt % to about 7.0 wt % of the composition.

In various embodiments, the coating composition further comprises pigment and/or general coating extender and/or formulation additives. In various embodiments, the amount/concentration of the pigment in the composition (or wet formulation) is from about 5.0 wt % to about 10.0 wt %, from about 5.5 wt % to about 9.5 wt %, from about 6.0 wt % to about 9.0 wt %, from about 6.5 wt % to about 8.5 wt %, from about 7.0 wt % to about 8.0 wt %, or about 7.5 wt % of the composition (or wet formulation). In various embodiments, the pigment used is selected from the group consisting of titania/$TiO_2$ and zinc oxide (ZnO). In various embodiments, the coating extender is selected from the group consisting of limestone (for e.g. $CaCO_3$), silica and zinc oxide (ZnO).

In various embodiments, the coating composition is suitable for use as a water-based coating composition.

In various embodiments, the coating composition is suitable for use as a water-based paint coating composition. In various embodiments, the coating composition further comprises pigments or colored pigments and/or general coating extenders and/or formulation additives.

Coating Layer

There is also provided a coating layer comprising one or more coalescing agent(s) disclosed herein chemically coupled to one or more polymer(s) via at least one of an ionic interaction or a covalent interaction.

In various embodiments, the coalescing agent and polymer contain one or more features and/or share one or more properties that are similar to those described above.

In various embodiments, the amine compound(s) represented by general formula (I) is/are physically formulated/mixed with the binder or latex polymer within a coating composition before applied as a coating. In various embodiments, upon application as a coating and dried, the amine compound(s) is/are chemically coupled (e.g. ionically coupled) with the polymer to form a coating layer/film (e.g. dry film). Advantageously, in various embodiments, as the amine compounds are chemically coupled to the polymer after formation of the coating layer/film, the amine compounds are prevented from being released into the environment.

In various embodiments, the coating layer/film has a minimum film formation temperature that is similar to or lower than commercial coating layers/films. In various embodiments, the coating layer/film has a minimum film formation temperature that is no more than about 80.0° C., no more than about 75.0° C., no more than about 70.0° C., no more than about 65.0° C., no more than about 60.0° C., no more than about 55.0° C., no more than about 50.0° C., no more than about 45.0° C., no more than about 40.0° C., no more than about 35.0° C., no more than about 30.0° C., no more than about 25.0° C., or no more than about 20.0° C.

In various embodiments, the coalescing agent(s) are configured/adapted to or capable of interacting with the polymer to cause an increase/recovery in glass transition temperature (Tg) during the formation of ionic bonds between said coalescing agent(s) and polymer, i.e. during film formation of the composition. In various embodiments, the increase/recovery in Tg (from Tg of the coating composition comprising free coalescing agent and polymer to Tg of the coating film comprising coalescing agent ionically coupled to polymer) comprises a temperature increase/recovery of from about 1 K to about 40 K, from about 5 K to about 35 K, from about 10 K to about 30 K, or about 20 K.

In various embodiments, the coating layer has one or more, two or more, three or more, four or more, five or more, six or more, seven or more, eight or more, nine or more, or all of the following properties: odourless, non-tacky, non-sticky, substantially colourless in solution, substantially insoluble in water, substantially do not blister in water, substantially do not delaminate in water, chemically and/or physically stable, excellent resistance towards natural exposure/weathering and substantially inert towards ultraviolet (UV) light.

Advantageously, various embodiments of the coalescing agent, coating composition and coating layer disclosed herein overcome or at least ameliorate one or more of the inherent issues of conventional coating formulations as described above.

In various embodiments, by using amine based coalescing agent in the coating composition disclosed herein, the composition eliminates (and acts as neutralizing agent) the need to add ammonia. It will be appreciated by a person skilled in the art that ammonia is an essential component in many waterborne coating formulations that is mainly used to control the pH of the coating (to approximately pH of 8-10). However, ammonia containing coatings typically have a smell/odour. Advantageously, by using amine based coalescing agent in the coating composition disclosed herein, embodiments of the coating composition and hence the coating layer disclosed herein are odourless, therefore overcoming odor problems of conventional waterborne coating formulations.

In various embodiments, the coalescing agent, coating composition and/or coating layer are substantially free from volatile organic compounds (VOCs). In various embodiments, the coalescing agent, coating composition and/or coating layer do not release volatile organic compounds (VOCs) emission.

Advantageously, in various embodiments, by using amine based coalescing agent in the coating composition disclosed herein and allowing said coalescing agent to chemically bond to the polymer after film formation is completed, the coalescing agent is prevented from being released to the environment.

Methods

There is provided a method of preparing an amine compound as disclosed herein, the method comprising: mixing a secondary amine precursor compound having general formula (II) with an unsaturated carbonyl compound having general formula (III):

(II)

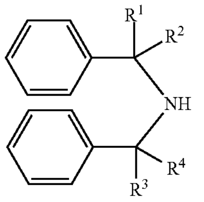

(III)

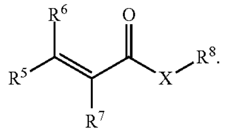

In various embodiments, X, $R^1$, $R^2$, $R^3$, $R^4$, $R^5$, $R^6$, $R^7$ and $R^8$ contain one or more features and/or share one or more properties that are similar to those described above.

In various embodiments, the step of mixing is performed in the absence of a solvent, i.e. under solvent-less conditions.

In various embodiments, the step of mixing is performed in the presence of a suitable solvent or a medium. The suitable solvent may be an organic solvent selected from the group consisting of acetonitrile, dichloromethane, pentane, tetrahydrofuran, benzene, chloroform, diethyl ether and hexane. It is to be appreciated that the type of solvent used is dependent on the type of reactants used and is not limited to the above. In various embodiments, the medium comprises aqueous solutions such as in water. For example, the medium may be a mixture of organic solvent and water.

In various embodiments, the ratio of organic solvent to water present in the medium is from about 20:1 to about 1:20. In various embodiments, the ratio of organic solvent to water is about 20:1, 10:1, 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, about 1:10 or about 1:20.

In various embodiments, the step of mixing is optionally performed in the presence of a catalyst such as a lewis acid catalyst selected from the group consisting of ceric ammonium nitrate, lanthanum trichloride, zirconium (IV) chloride, samarium(III) triflate and cadmium(II) chloride.

In various embodiments, the step of mixing is performed for at least about 5 minutes, at least about 10 minutes, at least about 20 minutes, at least about 30 minutes, at least about 1 hour, at least about 2 hours, at least about 3 hours, at least about 4 hours, at least about 5 hours, at least about 10 hours, at least about 15 hours, at least about 20 hours, at least about 25 hours, at least about 30 hours, at least about 35 hours, at least about 1 day, at least about 2 days, at least about 3 days, at least about 4 days, at least about 5 days, at least about 6 days, at least about 7 days, at least about 8 days, at least about 9 days, at least about 10 days, at least about 15 days, at least about 20 days, at least about 25 days, at least about 30 days, at least about 35 days, at least about 40 days, at least about 45 days, at least about 50 days, or at least about 60 days.

In various embodiments, the step of mixing is performed at a temperature range of from about 0° C. to about 100° C., from about 5° C. to about 95° C., from about 10° C. to about 90° C., from about 15° C. to about 85° C., from about 20° C. to about 80° C., from about 25° C. to about 75° C., from about 30° C. to about 70° C., from about 35° C. to about 65° C., from about 40° C. to about 60° C., from about 45° C. to about 55° C., or at about 50° C.

In various embodiments, the step of mixing comprises a Michael addition between a secondary amine precursor compound having general formula (II) (i.e. Michael donor) with an unsaturated carbonyl compound having general formula (III) (i.e. Michael acceptor). In various embodiments, the unsaturated carbonyl compound comprises any one of an α,β-unsaturated ester or α,β-unsaturated amide.

There is also provided a method of preparing functionalized amine compound having dual functionality as disclosed herein, the method comprising: mixing a tertiary amine precursor compound having at least one hydroxyl group(s) with an acid anhydride. The acid anhydride may be selected from the group consisting of methacrylic anhydride and acrylic anhydride.

In various embodiments, the step of mixing is performed in the presence of a suitable base such as trimethylamine or triethylamine.

In various embodiments, the step of mixing is optionally performed in the presence of a catalyst such as 4-dimethylaminopyridine (DMAP).

In various embodiments, the step of mixing comprises an esterification reaction.

There is also provided a method of preparing a coating layer/film disclosed herein, the method comprising:

(i) mixing one or more coalescing agent(s)/amine compound(s) represented by general formula (I) with one or more polymer(s) to obtain a coating composition; and (ii) drying/curing the coating composition to obtain a coating layer/film.

In various embodiments, the step of drying/curing is performed for at least about 1 hour, at least about 2 hours, at least about 3 hours, at least about 4 hours, at least about 5 hours, at least about 10 hours, at least about 15 hours, at least about 20 hours, at least about 25 hours, at least about 30 hours, at least about 35 hours, at least about 1 day, at least about 2 days, at least about 3 days, at least about 4 days or at least about 5 days.

In various embodiments, the step of drying/curing is performed at a temperature range of from about 0° C. to about 100° C., from about 5° C. to about 95° C., from about 10° C. to about 90° C., from about 15° C. to about 85° C., from about 20° C. to about 80° C., from about 25° C. to about 75° C., from about 30° C. to about 70° C., from about 35° C. to about 65° C., from about 40° C. to about 60° C., from about 45° C. to about 55° C., or at about 50° C.

BRIEF DESCRIPTION OF FIGURES

FIG. 11 also shows photographs of the latex polymer (acrylate latex IRS-129) taken after heating at 100° C. for 4 days (i); when mixed with ACA4 (ii); when mixed with PPH (iii); and when mixed with texanol ester alcohol (iv). ACA4 seemed to reduce oxidation and coloration of polymer.

EXAMPLES

Example embodiments of the disclosure will be better understood and readily apparent to one of ordinary skill in the art from the following examples, tables and if applicable, in conjunction with the figures. It should be appreciated that other modifications related to structural, and chemical changes may be made without deviating from the scope of the invention. Example embodiments are not necessarily mutually exclusive as some may be combined with one or more embodiments to form new example embodiments. The example embodiments should not be construed as limiting the scope of the disclosure.

Example 1: Features/Advantages of Amine Based Coalescing Agents

Figure 12:
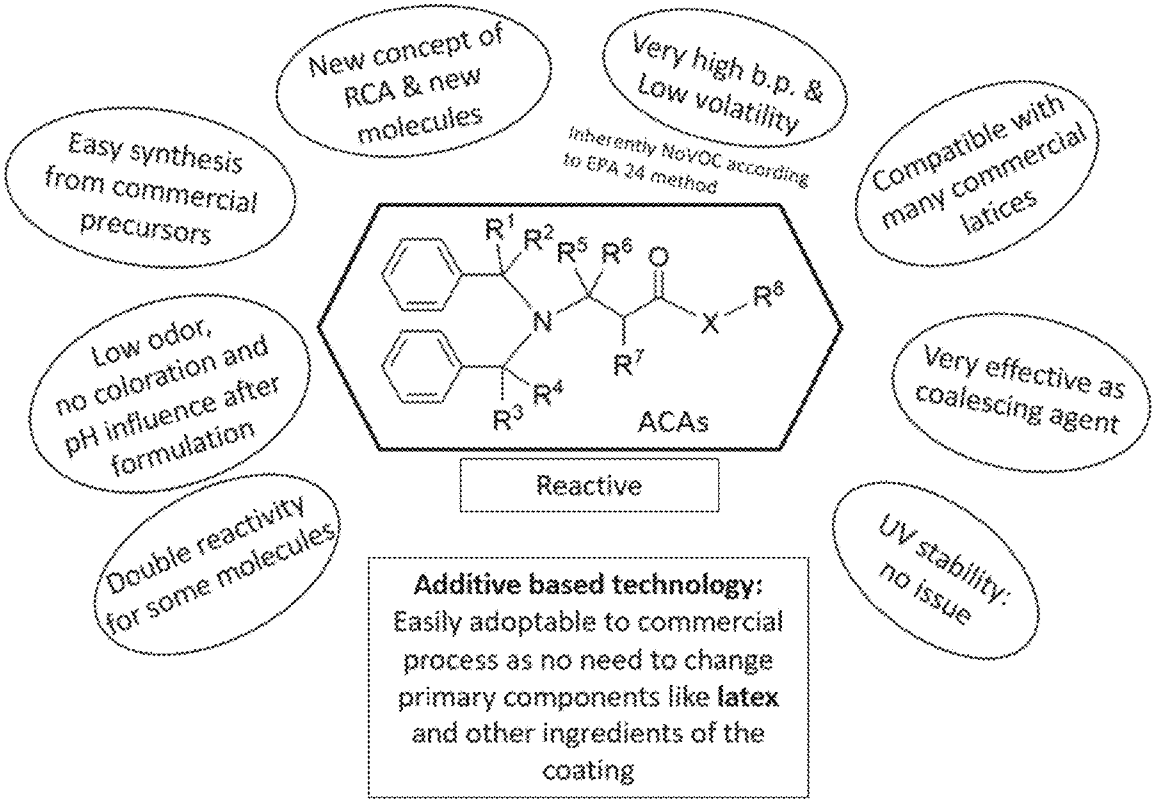
FIG. 12 shows technical features/advantages of amine based coalescing agents designed in accordance with various embodiments disclosed herein.

In the following examples, the synthesis of novel amine based coalescing agents (ACAs) and their application as reactive coalescing agents (RCAs) for waterborne coatings are reported. FIG. 12 shows some of the technical features/advantages of the amine based coalescing agents designed in accordance with various embodiments disclosed herein.

Advantageously, these ACAs compound designed in accordance with various embodiments disclosed herein are easy to synthesize via Michael addition reaction. These molecules also possess all the necessary/required characteristics/properties of conventional coalescing agents (CAs).

Embodiments of these compounds have boiling points >250° C. and are therefore termed as "no-VOC" (according to European and Canadian regulations, e.g., European Union directive 2014/42/EC). Volatility of these amine based coalescing agents are lower than commercial coalescing agents (CAs) in the art, therefore showing their potential for use in producing low/no-VOC waterborne coating formulations.

These amine based coalescing agents are reactive (therefore regarded as reactive coalescing agents (RCAs)) towards acid functionality, which is an important component of most waterborne coatings. Due to its Lewis basicity, the amine based coalescing agents interact with —COOH groups present within (almost all) latex binder polymer after drying and do not get released into the environment. As will be shown in the following examples, the ACA/—COOH interaction and no-release characteristics were confirmed by NMR spectroscopy.

There is no or substantially no coloration when formulated in waterborne coatings even though the coalescing agents designed in accordance with various embodiments disclosed herein are amine based compounds. As will be appreciated by a person skilled in the art, amine based compounds are typically colored.

Novel dual reactive coalescing agents were also successfully designed and synthesized via incorporation of reactive vinyl group(s) to these structures.

Even more advantageously, the amine based coalescing agents designed in accordance with various embodiments disclosed herein can be easily and readily used/adopted in industrial applications via an "additive based" approach. The ACAs can be added directly to the formulation of commercial coatings. There is no need to change the core formulation (such as latex type or pigments etc). Coating formulations can be prepared by simply adding the amine based coalescing agents in replacement of commercial/traditional coalescing agents. In summary, the amine based coalescing agents designed in accordance with various embodiments disclosed herein are no-VOC amine based coalescing agents that can be used in the formulation of no/low-VOC (preferentially waterborne) coatings by simply replacing currently used coalescing agents (and without changing major coating components).

Example 2: Operation and Interactions of Amine Based Coalescing Agents

Figure 1:
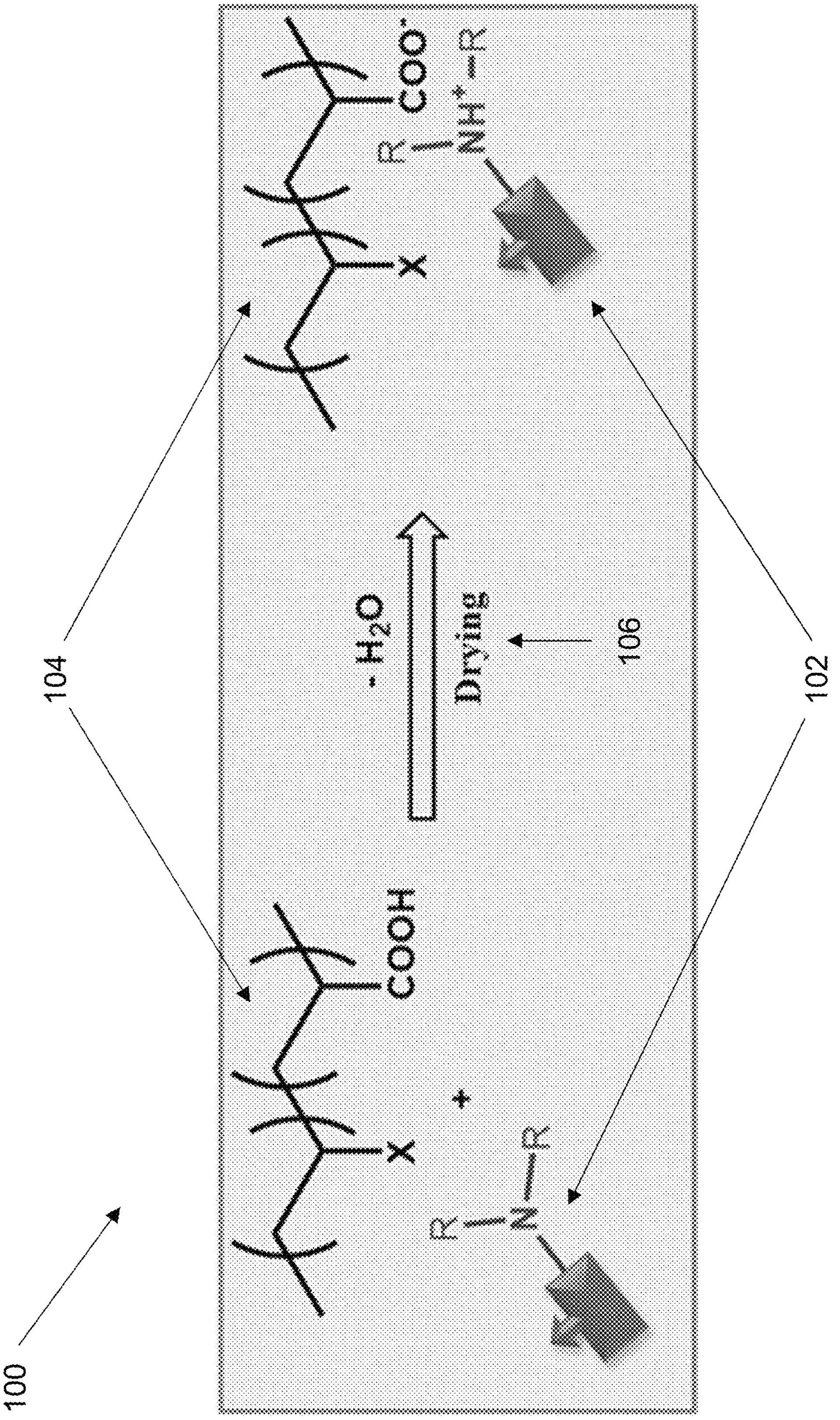
FIG. 1 is a schematic diagram 100 for illustrating the operation and interactions of amine based coalescing agents designed in accordance with various embodiments disclosed herein with a polymer during/upon drying at a molecular level.

FIG. 1 is a schematic diagram 100 for illustrating the operation and interactions of amine based coalescing agents designed in accordance with various embodiments disclosed herein with a polymer during/upon drying at a molecular level.

As shown in the schematic diagram 100, amine based coalescing agent 102 is mixed with a polymer containing —COOH group(s), for e.g., latex polymer 104. At step 106, during/upon drying, the amine based coalescing agent 102 reacts with the latex polymer 104 via acid-amine ionic interaction. The reaction is a triggerless one, i.e. the reaction proceeds in the absence of a separate/external chemical/physical trigger or stimulus (for e.g. metal catalyst and/or oxygen and/or UV light and/or initiator). Once the drying process is completed, a coating layer (not shown in FIG. 1) is formed which comprises amine based coalescing agent 102 chemically coupled to latex polymer 104 and becoming an integral and permanent part of the coating. It will be appreciated that the reactive amine based coalescing agents possess the characteristics as conventional coalescing agents (and also behave/act as conventional coalescing agents) until the coating formulation is dried to form a coating layer.

Figure 2:
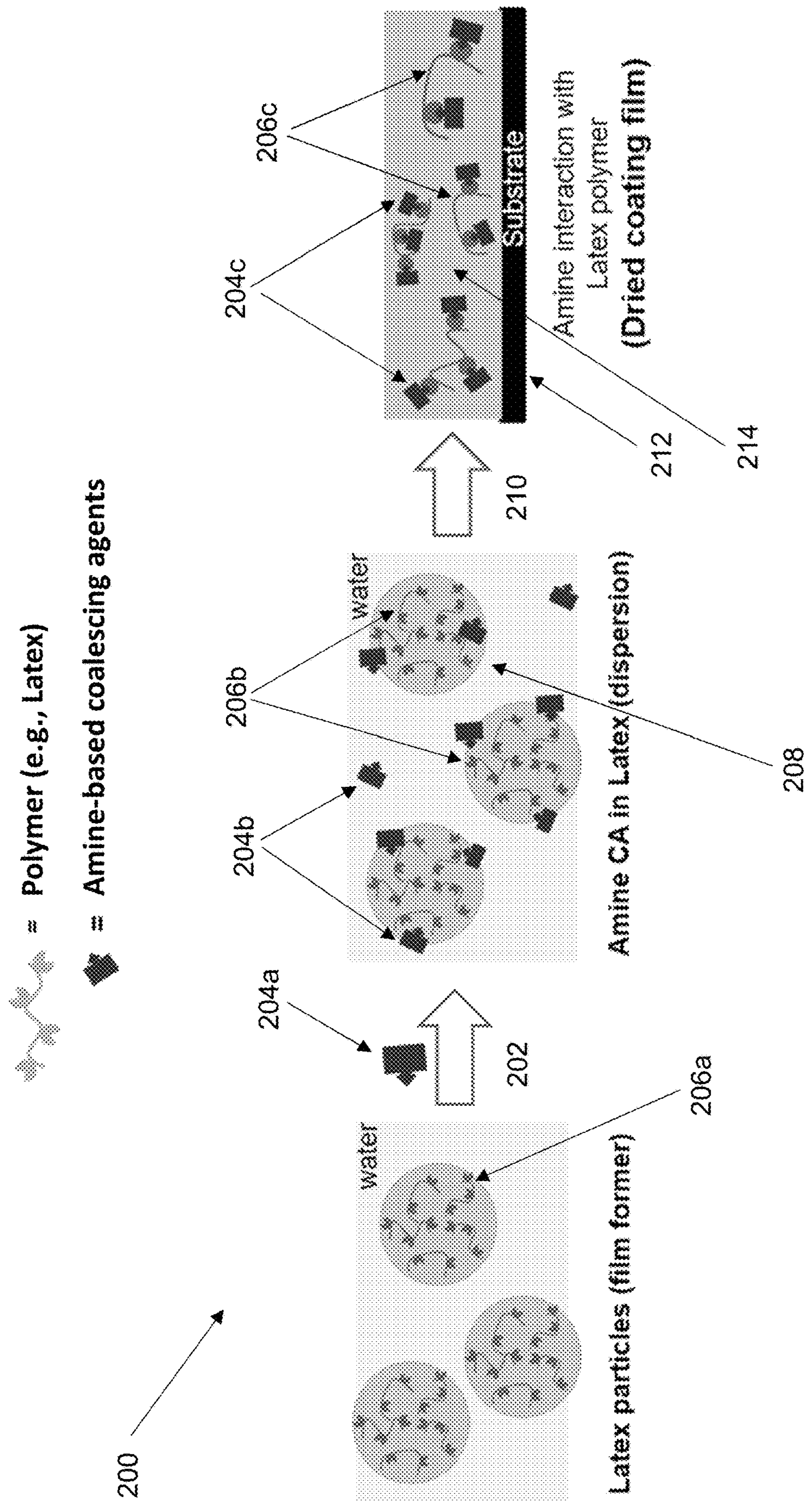
FIG. 2 is a schematic diagram 200 for illustrating the operation and interactions of amine based coalescing agents designed in accordance with various embodiments disclosed herein with a polymer during/upon drying at a material/coatings level.

FIG. 2 is a schematic diagram 200 for illustrating the operation and interactions of amine based coalescing agents designed in accordance with various embodiments disclosed herein with a polymer during/upon drying at a material/coatings level.

As shown in the schematic diagram 200, at step 202, amine based coalescing agents 204*a* are added to a polymer in water, for e.g., latex particles 206*a* to form a dispersion 208. The dispersion 208 comprises amine based coalescing agents 204*b* dispersed with/in latex particles 206*b*. At step 210, once the drying process is completed, a dried coating layer 212 comprising the amine based coalescing agents 204*c* chemically coupled to latex polymer 206*c* is formed on a substrate 214.

The amine based coalescing agents designed in accordance with various embodiments disclosed herein may also comprise dual functionality.

Figure 3:
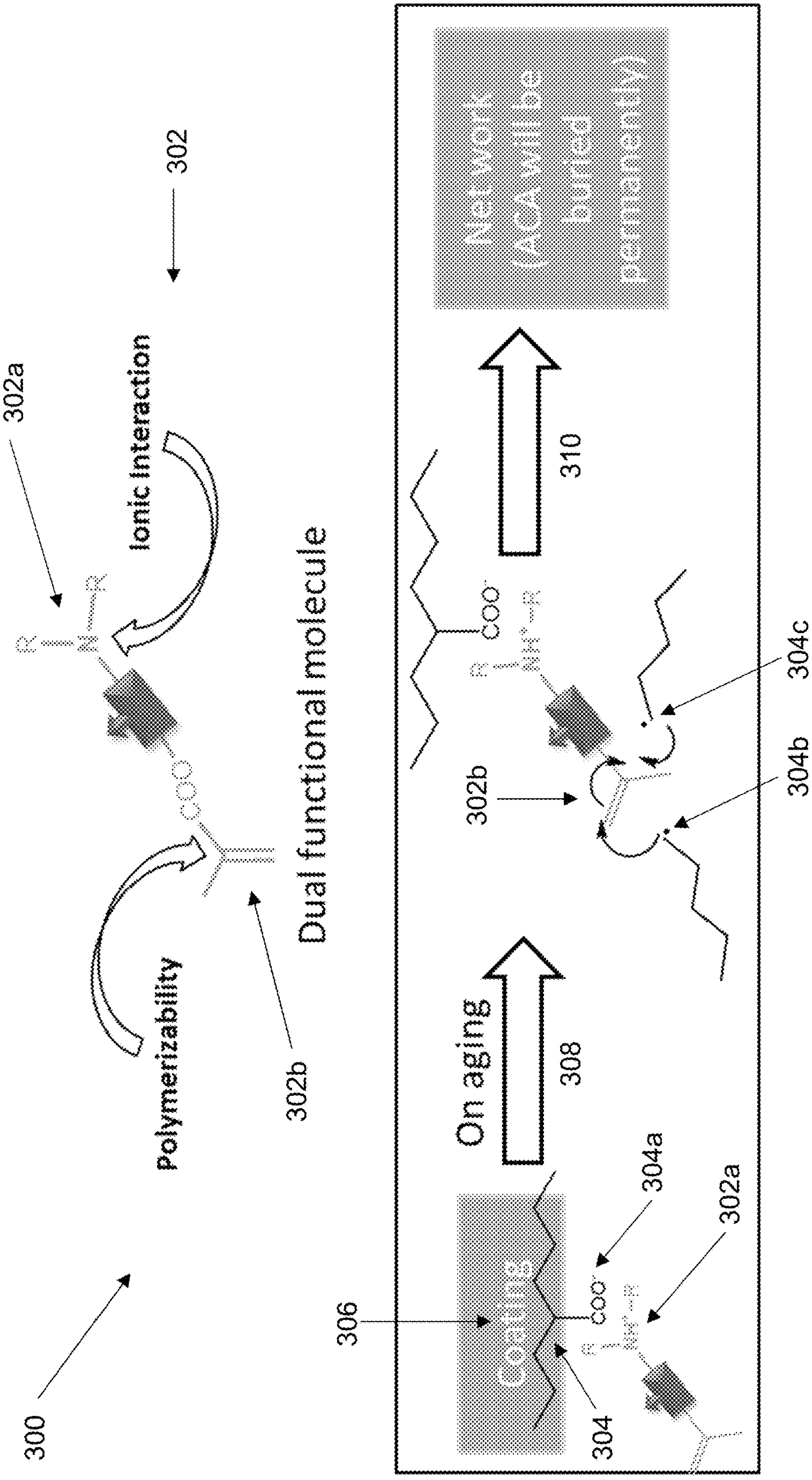
FIG. 3 is a schematic diagram 300 for illustrating the operation and interactions of amine based coalescing agents (having dual functionality) with a polymer containing —COOH group(s) on aging at a molecular level in accordance with various embodiments disclosed herein.

FIG. 3 is a schematic diagram 300 for illustrating the operation and interactions of amine based coalescing agents (having dual functionality) with a polymer containing —COOH group(s) on aging at a molecular level in accordance with various embodiments disclosed herein.

As shown in the schematic diagram 300, the amine based coalescing agent 302 comprises dual functionality/reactivity and is capable of interacting/coupling with a polymer via at least one of an ionic interaction/coupling or a covalent interaction/coupling (e.g., polymerization such as free radical addition polymerization). Dual functional amine based coalescing agent 302 comprises a first functional group (i.e. amine group (—$NR_2$)) 302*a* and a second functional group (e.g., vinyl group (C═C)) 302*b*.

FIG. 3 shows a coating layer 306 which comprises the amine group (—$NR_2$) 302*a* of the coalescing agent chemically coupled to the carboxylic acid group (—COOH) 304*a* of a polymer 304 via acid-amine ionic interaction. At step 308, on aging of the coating layer, free radical(s) 304*b* and 304*c* are produced and the vinyl group (C═C)) 302*b* of the coalescing agent undergoes free radical reaction or addition polymerization step 310, thereby forming a network wherein the amine based coalescing agent 302 is buried permanently.

Example 3: Synthesis and Characterization of Amine Based Coalescing Agents

Amine based reactive coalescing agents were synthesized via an atom efficient aza-Michael addition reaction of secondary amine to different acrylate/acrylamide monomers such as 2-hydroxyethyl acrylate, 2-hydroxypropyl acrylate, 2-ethylhexyl acrylate, ″butyl acrylate, and N-hydroxyethyl acrylamide etc (Table 1 and Scheme 2). The reactions were carried out neat or in water (in some cases, in the presence of 10% ceric ammonium nitrate (CAN) catalyst) at room temperature (RT)-80° C. to yield 80% to 95% conversion. Finally, the ACAs were purified by column chromatography and characterized by $^{1}$H-NMR and $^{13}$C-NMR spectroscopy, and elemental microanalysis (as will be shown in Examples 3.1 to 3.5). Other characterizations include determination of boiling point, volatility (% wt loss when heated at 110±5° C. for 1 hour as per USA EPA 24 method), and plasticizing effect, i.e. reduction of minimum film formation temperature (MFFT) of commercial latices.

TABLE 1

General structure of different ACAs designed in accordance with various embodiments disclosed herein General Structure:

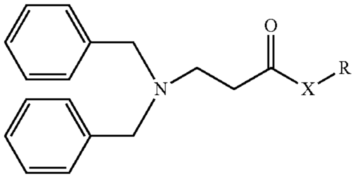

| X | R | ACA Example | Water Solubility |
|---|---|---|---|
| X = O | R = —$CH_2$—$CH_2$—OH | ACA4 | <0.06% |
| | R = —$CH_2$—$CH(CH_3)$—OH | ACA5 | <0.012% |
| | R = —$CH_2$—$CH(C_2H_5)$—$(CH_2)_3$—$CH_3$ | ACA6 | |
| | R = —$(CH_2)_3$—$CH_3$ | ACA7 | |
| | R = —$(CH_2$—$CH_2$—$O)_2$—$CH_2$—$CH_3$ | ACA16 | |
| | R = —$CH_2$—$CH_2$—OCO—$C(CH_3)$=$CH_2$ | ACA15 | |
| | R = —$CH_2$—CH(OH)—$CH_2$—OCO—$C(CH_3)$=$CH_2$ | ACA13 | |
| X = NH | R = —$CH_2$—$CH_2$—OH | ACA8 | |

Scheme 2. Aza-Michael addition reaction scheme of the synthesis of ACAs

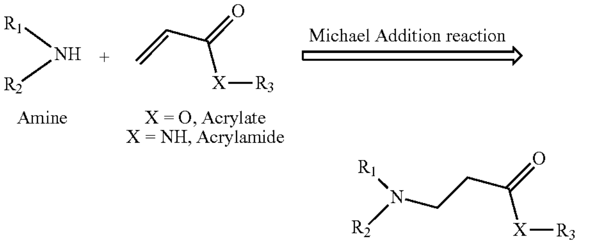

Amine

X = O, Acrylate
X = NH, Acrylamide

Amine Coalescing agents (ACA)

3.1. Synthesis of ACA4, ACA5, ACA6 and ACA7

Scheme 3. Synthesis of ACA4

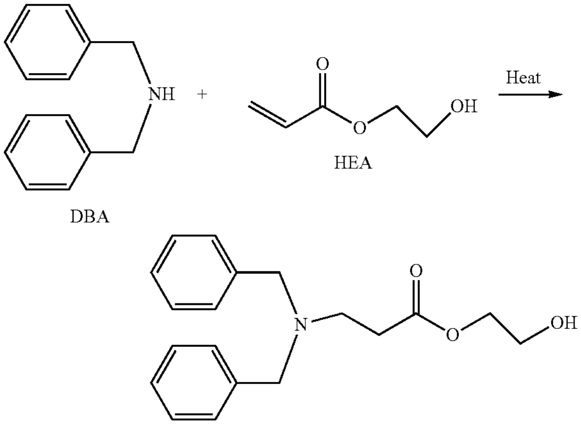

DBA

HEA

ACA4

Dibenzylamine (2 mL, 10.4 mmol) was added to 50 mL single neck RB flask at atmospheric conditions followed by slow addition of 2-hydroxy ethyl acrylate (1.31 mL, 11.4 mmol) compound at RT. The reaction continued for 30 hours at 50° C. and $^1$H-NMR shows monomer conversion of 88.2%. The reaction mixture was stirred in water for 30 min to remove any excess 2-hydroxy ethyl acrylate monomer and extracted with $CHCl_3$ solvent followed by rotary evaporator and vacuum dried at RT yielding 78% of compound and further purified by column chromatography (just to ensure purity) yields light pale yellowish color viscous oil. $^1$H NMR (400 MHz, Chloroform-d) δ 7.39-7.38 (d), 7.33-7.29 (t), 7.24-7.21 (t), 4.10-4.07 (t), 3.76-3.73 (t), 3.69-3.65 (t), 3.60 (s), 2.81-2.77 (dd), 2.56-2.52 (t); $^{13}$C NMR (101 MHz, $CDCl_3$) δ 173.41, 141.15, 130.26, 129.64, 128.35, 67.22, 61.41, 59.30, 50.61, 33.79; b.p. 292-297° C.

ACA5, ACA6 and ACA7 were prepared in a similar way as ACA4. Characterization details of these compounds are given below.

ACA5: $^1$H NMR (400 MHz, Chloroform-d) δ 7.40-7.38 (d), 7.33-7.29 (t), 7.24-7.21 (t), 3.94-3.88 (m), 3.77 (b), 3.60 (s), 2.82-2.77 (dd), 2.57-2.50 (m), 1.17-1.16 (d), 1.11-1.10 (d); $^{13}$C NMR (101 MHz, $CDCl_3$) δ 173.27, 173.08, 141.12, 130.27, 129.65, 128.36, 72.90, 70.69, 66.38, 66.06, 59.28, 50.69, 50.60, 33.96, 33.76, 20.71, 17.33; Calcd: C, 73.37; H, 7.70; N, 4.28. Found: C, 73.18; H, 7.81; N, 4.34; b.p. 292-296° C.

ACA6: $^1$H NMR (400 MHz, Chloroform-d) δ 7.40-7.38 (d), 7.30-7.33 (t), 7.21-7.25 (t), 3.96-3.94 (m), 3.60 (s), 2.87 (s), 2.84 (s), 2.81-2.77 (t), 2.55-2.51 (t), 1.52 (m), 1.28 (m), 0.89-0.85 (m); $^{13}$C NMR (101 MHz, $CDCl_3$) δ 173.23, 140.92, 130.09, 129.50, 128.22, 67.37, 59.08, 50.45, 40.12, 33.66, 31.63, 24.94, 24.11, 14.82, 11.80; Calcd: C, 78.7; H, 9.25; N, 3.67). Found: C, 78.23; H, 9.20; N, 3.64; b.p. 354-364° C.

ACA7: $^1$H NMR (400 MHz, Chloroform-d) δ 7.38-7.36 (d), 7.32-7.29 (t), 7.24-7.20 (t), 3.99 (t), 3.58 (s), 2.86 (s), 2.83 (s), 2.77 (t), 2.51 (t), 1.56-1.49 (m), 1.38-1.28 (m), 0.91-0.87 (t); $^{13}$C NMR (101 MHz, $CDCl_3$) δ 173.16, 140.97, 130.09, 129.48, 128.20, 64.94, 59.09, 50.46, 33.68, 31.93, 20.27, 14.48; Calcd: C, 77.50; H, 8.36; N, 4.30. Found: C, 77.80; H, 8.32; N, 4.31; b.p. 342-350° C.

3.2. Synthesis of ACA13

Scheme 4. Synthesis of ACA13

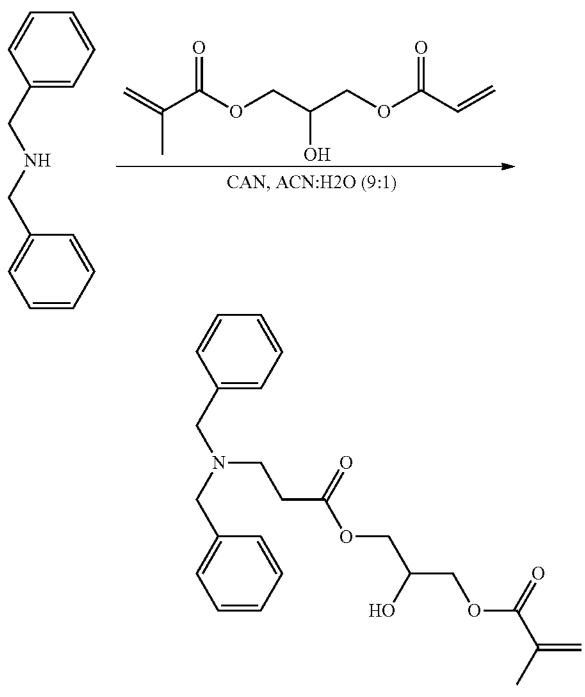

Exact Mass: 411.20

To dibenzylamine (6 g, 30.41 mmol) and 3-(Acryloyloxy)-2-hydroxypropyl methacrylate (5.21 g, 24.3 mmol) dissolved in 50 mL of ACN:$H_2O$ (9:1) was added ceric ammonium nitrite (0.5 g, 0.9 mmol) and stirred at ambient for 16 hours. The reaction mixture was diluted with diethyl ether and washed with water and ether layer was concentrated. Product purified in 20% EtOAC/Pet-ether to give the desired product as a light brown viscous oil in 40% yield; $^1$H NMR (400 MHz, Chloroform-d) δ 7.31 (m, 10H), 6.16 (t, J=1.2 Hz, 1H), 5.64 (t, J=1.6 Hz, 1H), 4.39-3.95 (m, 5H), 3.61 (s, 4H), 2.84 (t, J=7.0 Hz, 2H), 2.57 (t, J=7.0 Hz, 2H), 2.24-1.84 (m, 3H). $^{13}$C NMR (101 MHz, $CDCl_3$) δ 172.50, 167.32, 139.03, 135.81, 128.88, 128.24, 127.04, 126.30, 68.22, 65.28, 58.17, 49.17, 32.77, 18.29; b.p. 290-300° C. (gel point).

3.3. Synthesis of ACA15

Scheme 5. Synthesis of ACA15

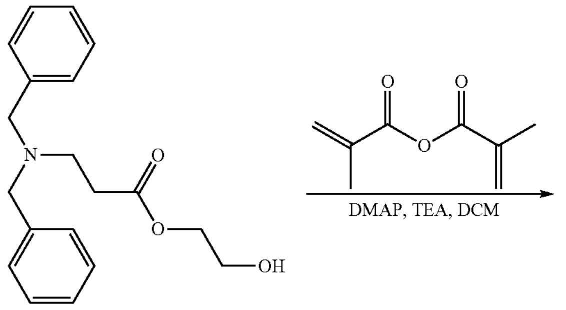

ACA4

-continued

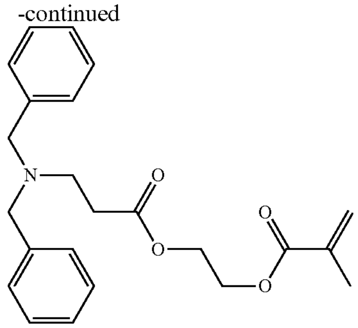

ACA15

To ACA4 (2.8 g, 8.93 mmol) and methacrylic anhydride (1.45 g, 9.38 mmol) in dichloromethane (DCM) was added trimethylamine (0.9 g, 9.83 mmol) and 4-dimethylaminopyridine (DMAP) (0.06 g, 0.5 mmol), and the reaction mixture was stirred at ambient for 4 hours. The reaction mixture was diluted with DCM and washed with water. DCM layer was concentrated and reaction mixture was purified by flash chromatography in 30% EtOAC/Pet-ether to give the desired product as light brown semi solid in 82% yield. $^1$H NMR (400 MHz, Chloroform-d) δ 7.36-7.11 (m, 10H), 6.02 (dd, J=1.6, 1.0 Hz, 1H), 5.62-5.39 (m, 1H), 4.21 (s, 4H), 3.52 (s, 4H), 2.76 (t, J=7.2 Hz, 2H), 2.46 (t, J=7.2 Hz, 2H), 1.86 (dd, J=1.6, 1.0 Hz, 3H); $^{13}$C NMR (101 MHz, $CDCl_3$) δ 172.26, 167.08, 135.90, 128.77, 128.20, 126.97, 126.00, 62.37, 62.01, 58.09, 49.14, 32.69, 18.24. m.p. 50° C., b.p. 251-254° C.

3.4. Synthesis of ACA16

Scheme 6. Synthesis of ACA16

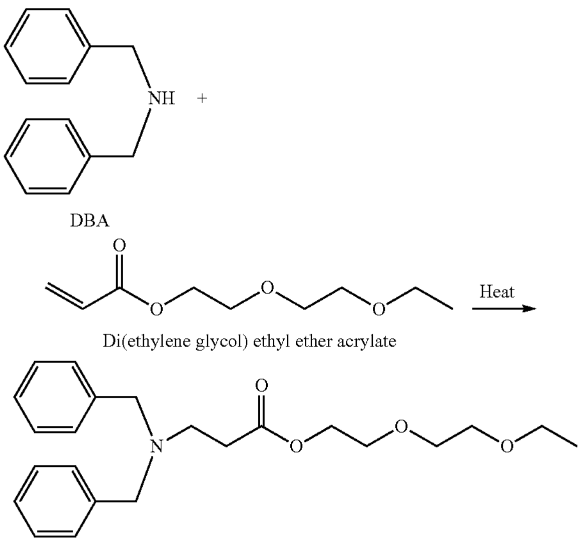

ACA16

Dibenzylamine (4.764 g, 24.15 mmol) and di(ethylene glycol) ethyl ether acrylate (5.0 g, 26.56 mmol) were mixed in a 50 mL single neck RB flask at atmospheric conditions. The mixture was then heated at 80° C. for 4 days to have 90% conversion with respect to (wrt) vinyl group. The product mixture was then stirred with water (2×50 mL), centrifuged and dried in a vacuum oven at 50° C. to yield light brown liquid. Yield 5.82 g, 62.5% (un-optimized). $^1$H NMR (400 MHz, Chloroform-d) δ 7.36-7.5 (m), 4.36 (t), 3.64-3.74 (m), 2.97 (t), 2.69 (t), 1.36 (t); $^{13}C$ NMR (101 MHz, $CDCl_3$) δ 172.5, 139.3, 128.7, 128.1, 126.9, 70.6, 69.7, 69.0, 66.7, 58.0, 49.1, 32.7, 15.2; b.p. 348-355° C.

3.5. Characterization of ACA4 to ACA8, ACA13, ACA15 and ACA16

Figure 13:
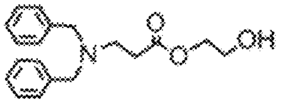
FIG. 13 shows structure of ACAs, boiling point (b.p.) and volatility results.
Figure 13:
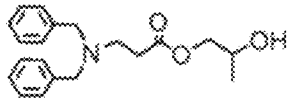
Figure 13:
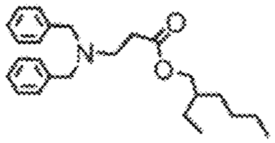
Figure 13:
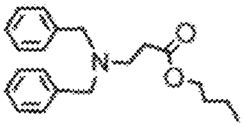
Figure 13:
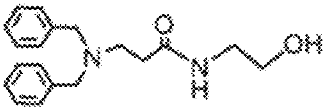
Figure 13:
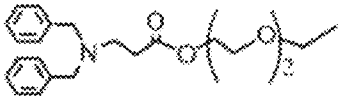
Figure 13:
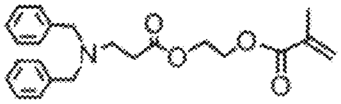
Figure 13:
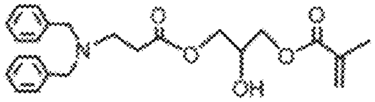

Characterization studies were performed on the ACA examples to determine their boiling points and volatility (% wt loss when heated at 110±5° C. for 1 hour as per USA EPA 24 method). The results obtained are shown in FIG. 13.

Figure 4A:
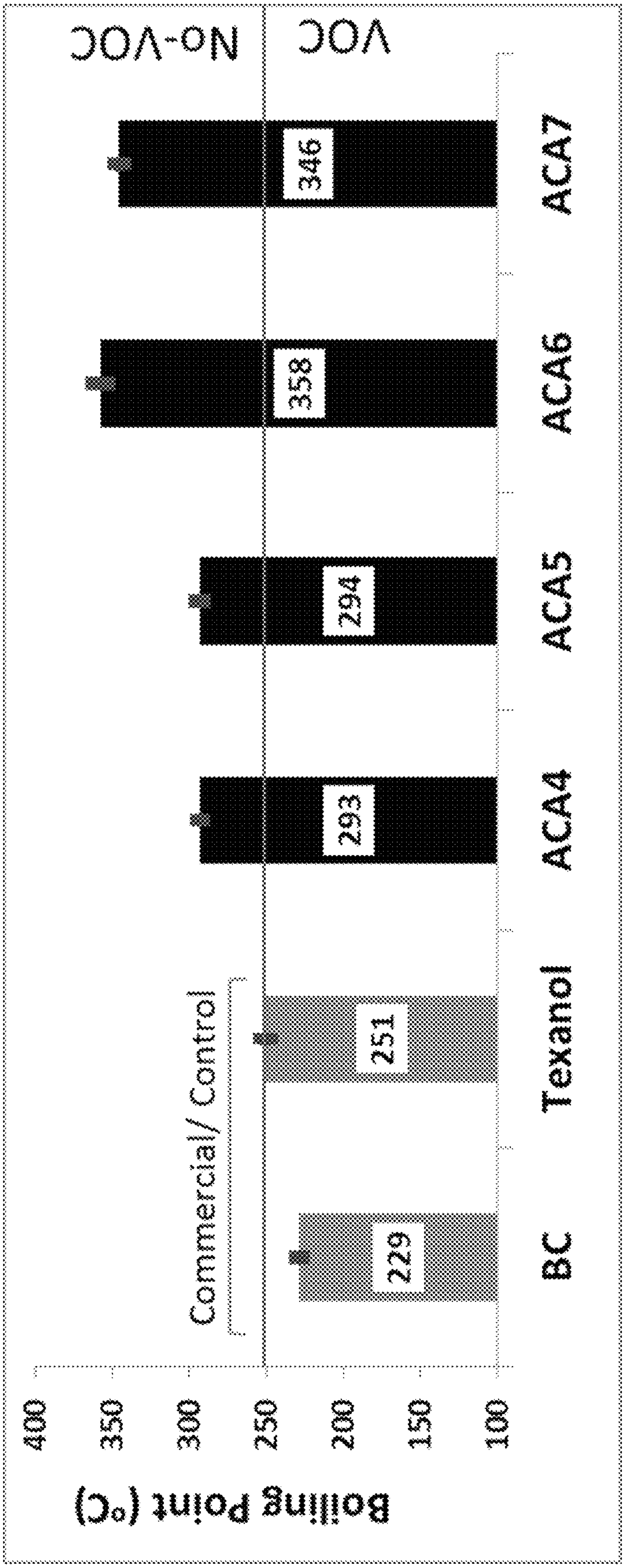
FIG. 4A is a graph showing the boiling points of ACA4, ACA5, ACA6 and ACA7 prepared in accordance with various embodiments disclosed herein, relative to butyl carbitol (BC) and texanol ester alcohol which were used as comparison/control.
Figure 4B:
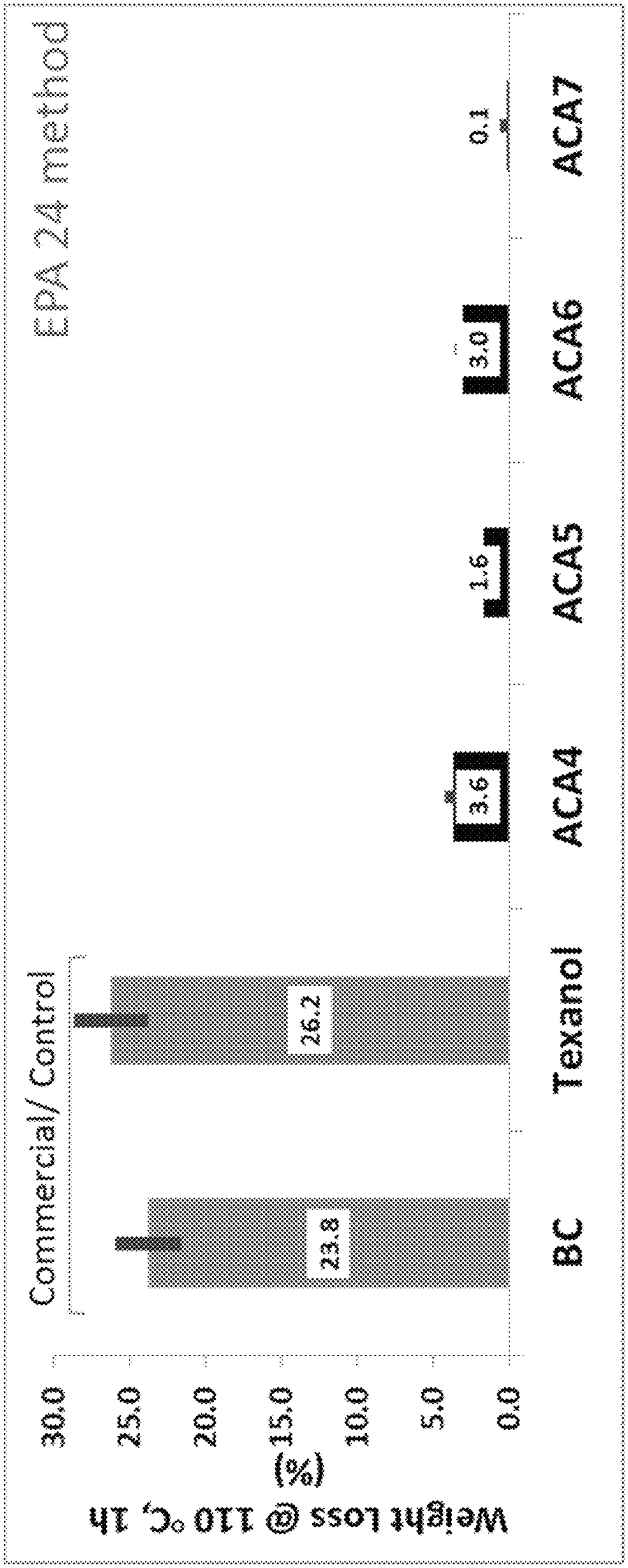
FIG. 4B is a graph showing the volatility (% wt loss when heated at 110±5° C. for 1 hour as per USA EPA 24 method) of ACA4, ACA5, ACA6 and ACA7 prepared in accordance with various embodiments disclosed herein, relative to butyl carbitol (BC) and texanol ester alcohol which were used as comparison/control.

In Table 1, ACA15 and ACA13 have dual functionality and/or are dual reactive molecules. The boiling points of ACA4, ACA5, ACA6 and ACA7 are shown in FIG. 4A alongside with butyl carbitol (BC) and texanol which were used as comparison/control. The volatility of ACA4, ACA5, ACA6 and ACA7 are shown in FIG. 4B alongside with butyl carbitol (BC) and texanol which were used as comparison/control.

Example 4: Formulation and Evaluation of Amine Based Coalescing Agents 4.1. Minimum Film Formation Temperature (MFFT) of Commercial Latices Mixed With Amine Based Coalescing Agents ACAs were mixed (2 wt %) with three different commercial waterborne latices (BASF 538A, Nippon N-2398 and ECO338) and minimum film formation temperature (MFFT) of these lattices were determined using MFFT recorder (MFFT-90-MFFT Bar) according to ASTM D2354. The results are presented in FIG. 5A (using BASF 538A as latex (L)), FIG. 5B (using Nippon N-2398 as latex (L)) and FIG. 5C (using ECO338 as latex (L) respectively.

Figure 5A:
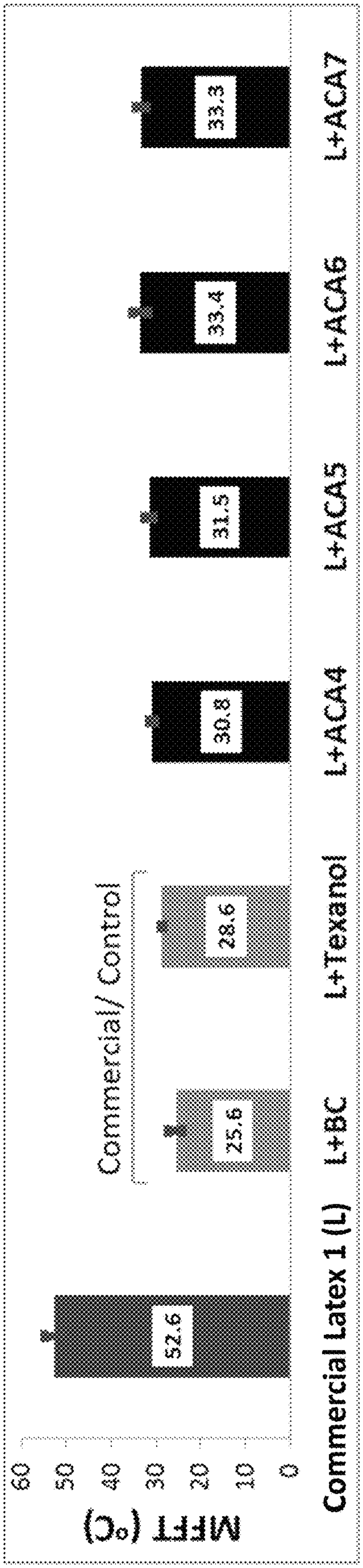
FIG. 5A is a graph showing the minimum film formation temperature (MFFT) of commercial waterborne latex 1 (L) mixed respectively with ACA4, ACA5, ACA6 and ACA7 (2 wt % of coalescing agents were used). Controls used were butyl carbitol (BC) and texanol ester alcohol. As shown, there is a reduction in the MFFT by using ACAs designed in accordance with various embodiments disclosed herein. Commercial latex 1 used as a comparative example is BASF 538A.
Figure 5B:
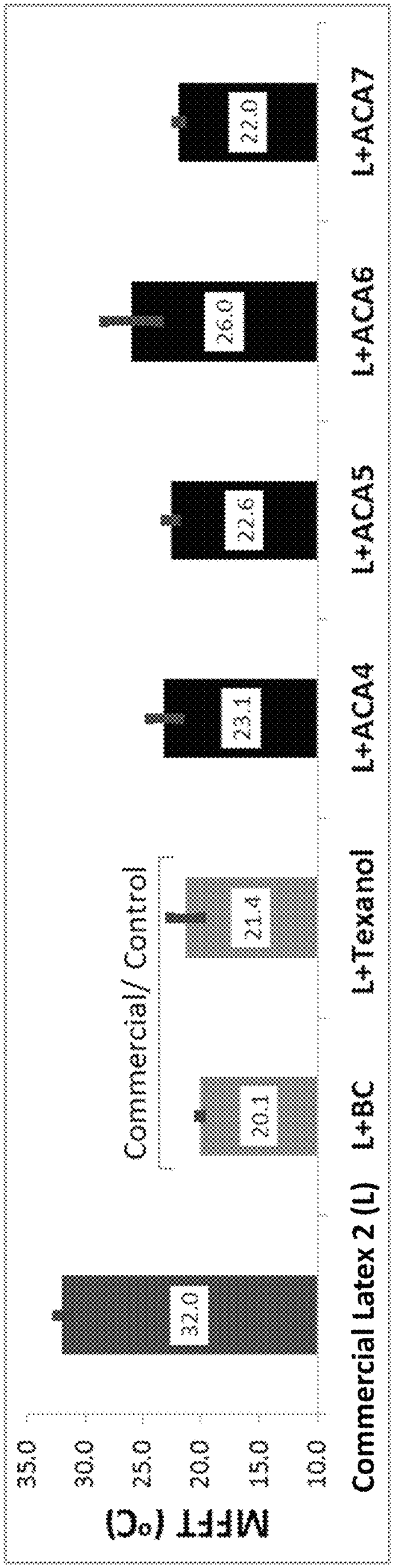
FIG. 5B is a graph showing the minimum film formation temperature (MFFT) of commercial waterborne latex 2 (L) mixed respectively with ACA4, ACA5, ACA6 and ACA7 (2 wt % of coalescing agents were used). Controls used were butyl carbitol (BC) and texanol ester alcohol. As shown, there is a reduction in the MFFT by using ACAs designed in accordance with various embodiments disclosed herein. Commercial latex 2 used as a comparative example is Nippon N-2398.
Figure 5C:
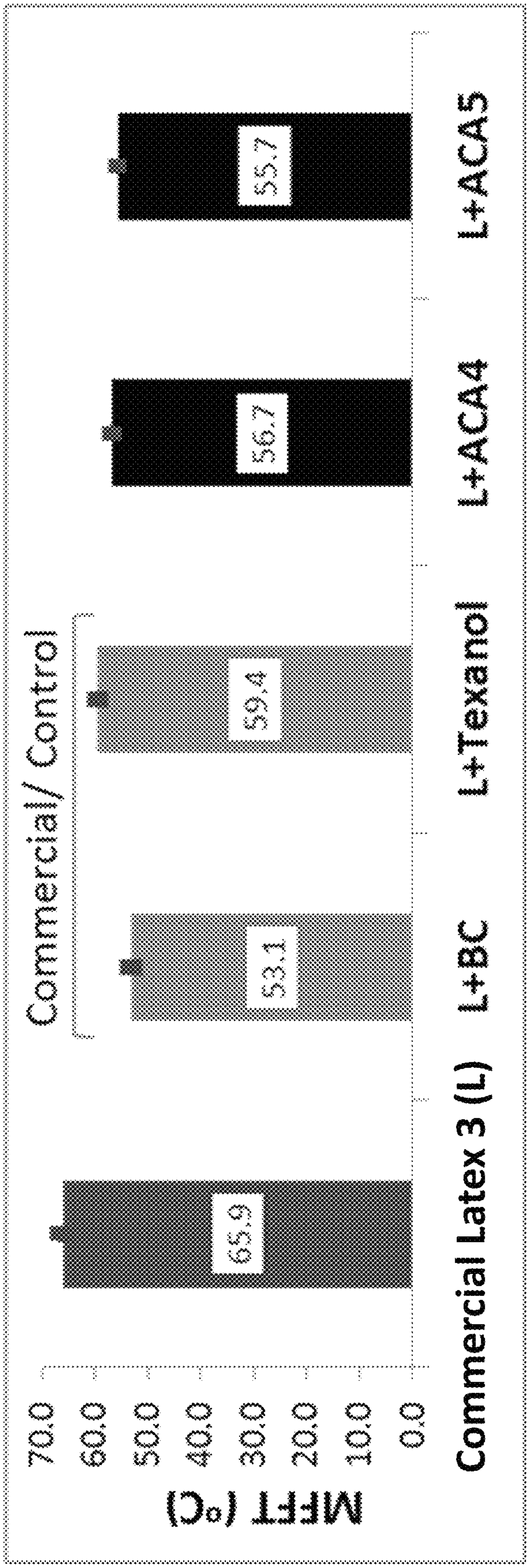
FIG. 5C is a graph showing the minimum film formation temperature (MFFT) of commercial waterborne latex 3 (L) mixed respectively with ACA4 and ACA5 (2 wt % of coalescing agents were used). Controls used were butyl carbitol (BC) and texanol ester alcohol. As shown, there is a reduction in the MFFT by using ACAs designed in accordance with various embodiments disclosed herein. Commercial latex 3 used as a comparative example is ECO338.

As shown in FIG. 5A to 5C, the MFFT of the commercial latices were reduced by using ACAs (2 wt %). It is therefore shown that the ACAs designed in accordance with various embodiments disclosed herein have similar or sometimes even better efficiency as compared with the commercial controls (namely butyl carbitol (BC) and Texanol ester alcohol). MFFT is the lowest temperature at which a latex will uniformly coalesce when laid on a substrate as a thin film and produce smooth homogeneous crack free coating film. An accurate MFFT value allows formulation of coatings that cure correctly under a specified application conditions or environment.

4.2. Mixing of ACA4 with —COOH Containing Latex for Reactivity Study Evaluated With NMR Spectroscopy Using ACA4 as an example, amine based coalescing agents designed in accordance with various embodiments disclosed herein were mixed with —COOH containing latex for reactivity study and evaluated with NMR spectroscopy.

4.2.1. Synthesis of Latex (IRS-129)

In a 250 mL jacketed reactor was charged with 125 g of distilled water, 2.0 g of sodium dodecyl sulphate, 885 mg of ammonium persulfate, and 650 mg of $NaHCO_3$ and purged with argon for 30 min at room temperature before the reaction. The monomer mixture (Butyl methacrylate ("BMA) 46.26 g, methyl methacrylate (MMA) 26.04 g, and methacrylic acid (MAA) 2.66 g) was degassed for 30 min at room temperature and added slowly for 3 hrs (≈27 mL/hr). The glass reactor was connected to Lauda water heater and the reaction was continued for 6 hrs at 65° C. Finally, the reaction mixture was heated to 80° C. for 1 hr to complete the polymerization reaction. After the reaction, the latex sample pH was adjusted to (≈10.0) using the $NH_3$(aq). The latex particle size was measured using Malvern DLS instrument ($Z_{ave}$=63.0 nm, PDI=0.075) (Total solid content=39.0 wt %). Expected copolymer structure is Poly($BMA_{52.8}$-co-$MMA_{42.2}$-co-$MAA_5$).

Figure 6:
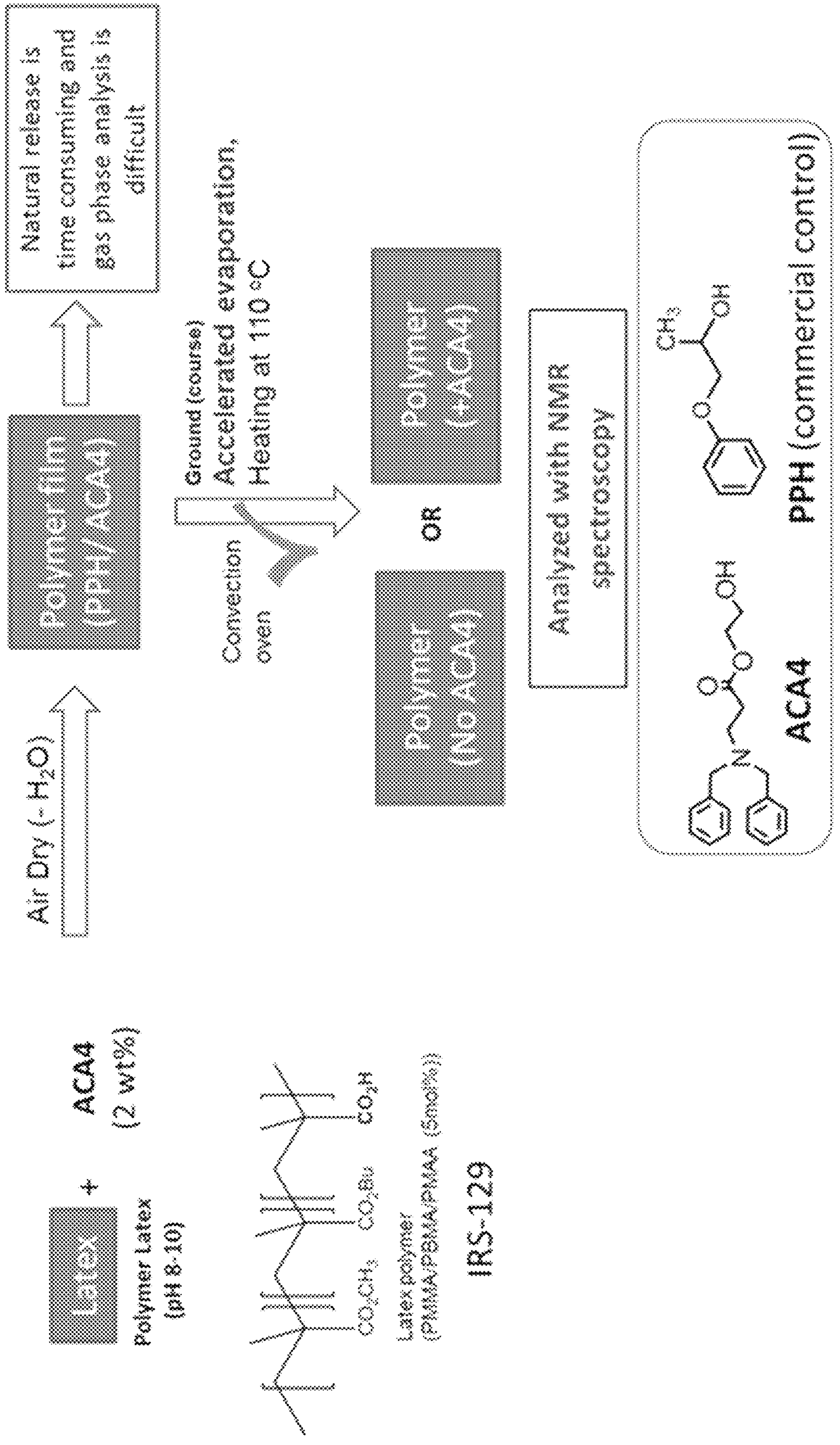
FIG. 6 is a schematic diagram for illustrating the method used for film formation from the amine based coalescing agents designed in accordance with various embodiments disclosed herein (using ACA4 as an example) and latex polymer (using acrylate latex e.g., IRS-129 as an example). After film formation, the film is air dried followed by accelerated evaporation at 110° C. Traditional coalescing agents like 1-Phenoxy-2-propanol (PPH) and Texanol were used as control.

4.2.2. Blending ACA4 with Latex IRS-129, Film Formation and Accelerated Release Study FIG. 6 is a schematic diagram for illustrating the method used for film formation from the amine based coalescing agents designed in accordance with various embodiments disclosed herein (using ACA4 as an example) and latex polymer (using acrylate latex e.g., IRS-129 as an example). Traditional coalescing agents like 1-Phenoxy-2-propanol (PPH) and Texanol were used as control.

At first, ACA4 (2 wt % with respect to latex) was first blended with IRS-129 latex (containing —COOH groups) using dispermat (LC75-E) and the mixture was allowed to dry at room temperature for 2 days. Then, the polymer film was grounded to make powder and then heated at 110° C. in a convection oven, i.e. accelerated evaporation (as illustrated in FIG. 6). Accelerated evaporation was used in this study instead as natural release is time consuming and gas analysis is difficult.

Samples were collected time to time, dissolved in NMR solvent and analyzed by $^1H$ NMR spectroscopy (with 25 mg of sample, 0.8 mL of $CDCl_3$, and 25 μL of DMF/$CDCl_3$ as internal standard). High boiling commercial coalescing agent, 1-Phenoxy-2-propanol (PPH) (b.p. 243° C.) was used as control.

Figure 7A:
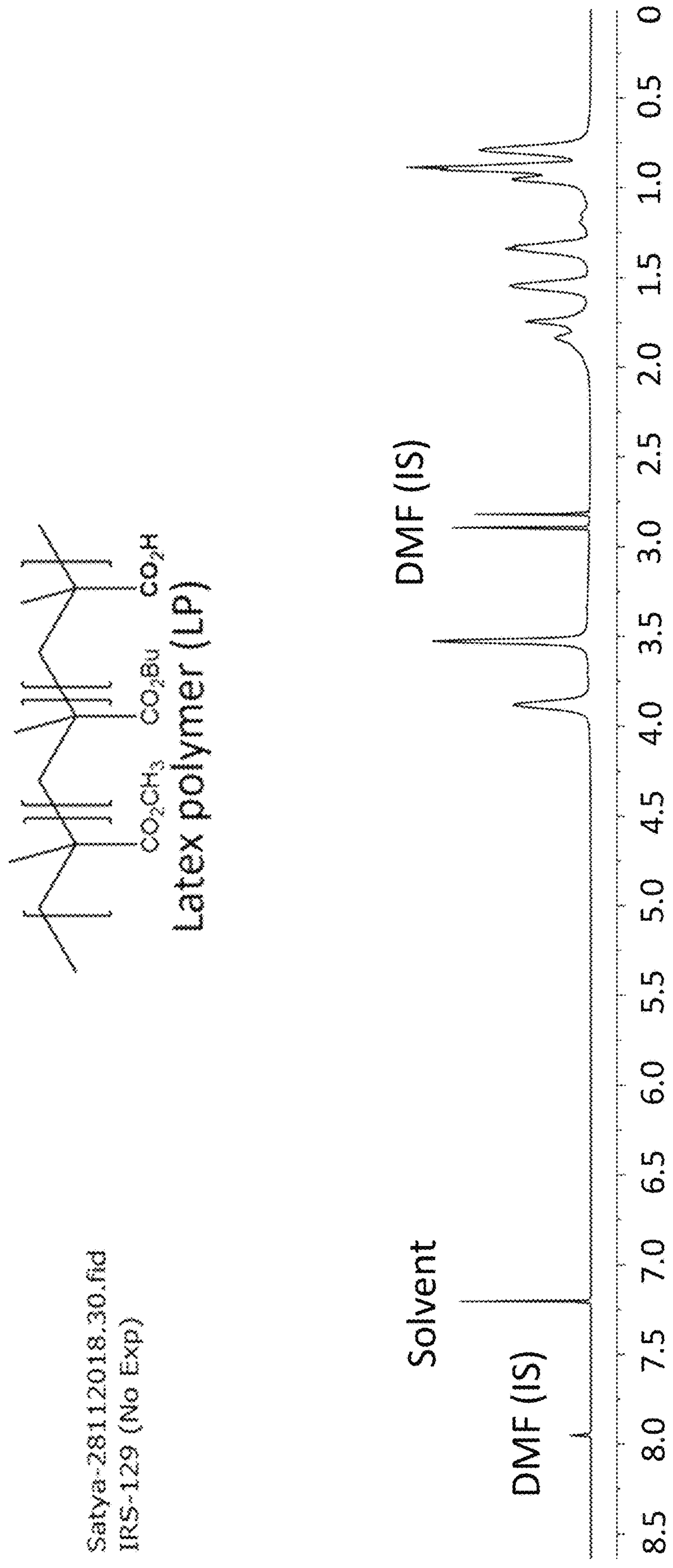
FIG. 7A is a $^1$H NMR spectrum of a latex polymer (namely poly(methyl methacrylate)/poly(butyl methacrylate)/poly(methacrylic acid) (PMMA/PBMA/PMAA)) in the absence of any coalescing agent.
Figure 7B:
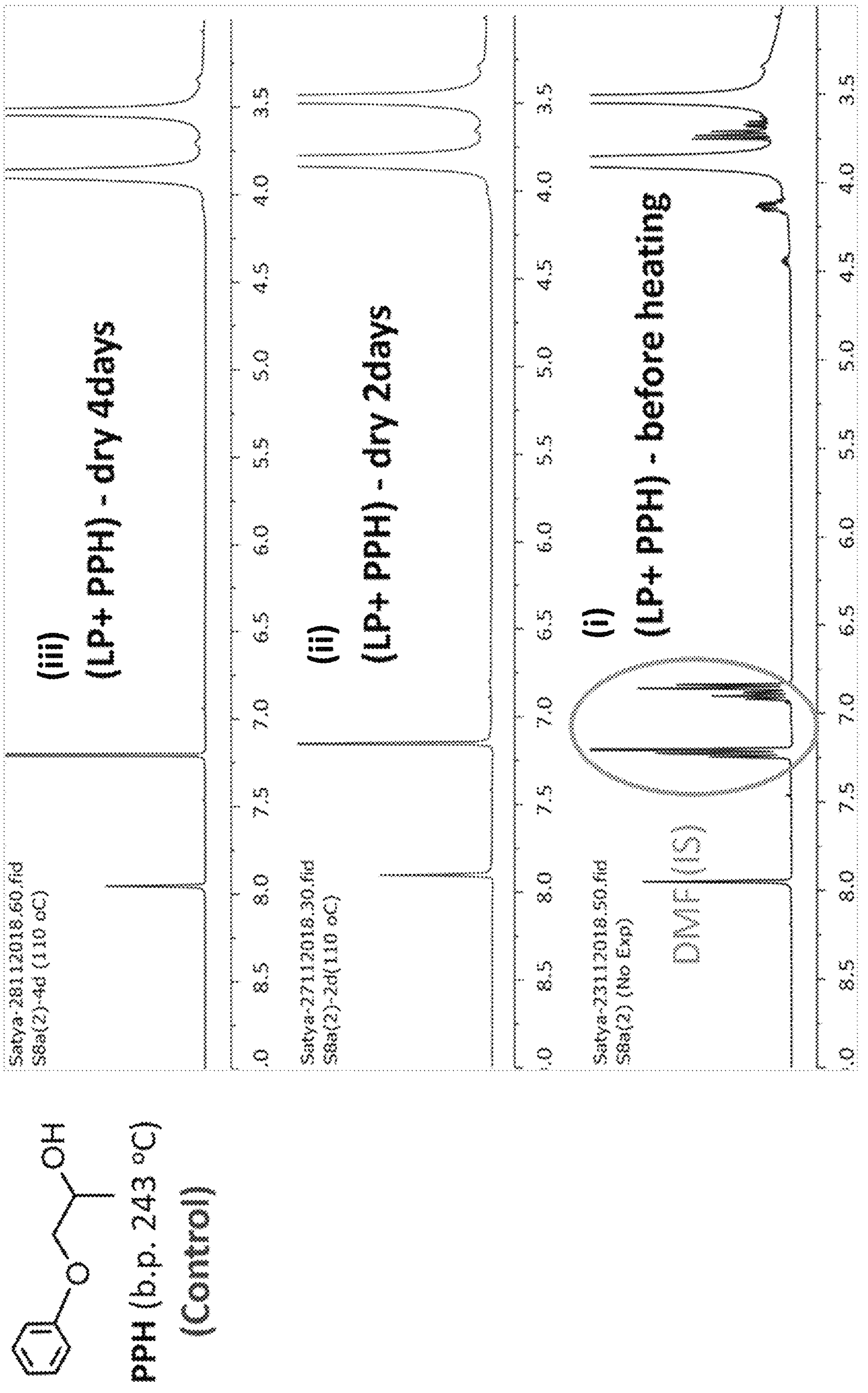
FIG. 7B shows $^1$H NMR spectra of a latex polymer (PMMA/PBMA/PMAA) in the presence of comparative example PPH (i) before heating; (ii) after drying/heating at 110° C. for 2 days; and (iii) after drying/heating at 110° C. for 4 days. PPH disappeared from coating film after heating.
Figure 7C:
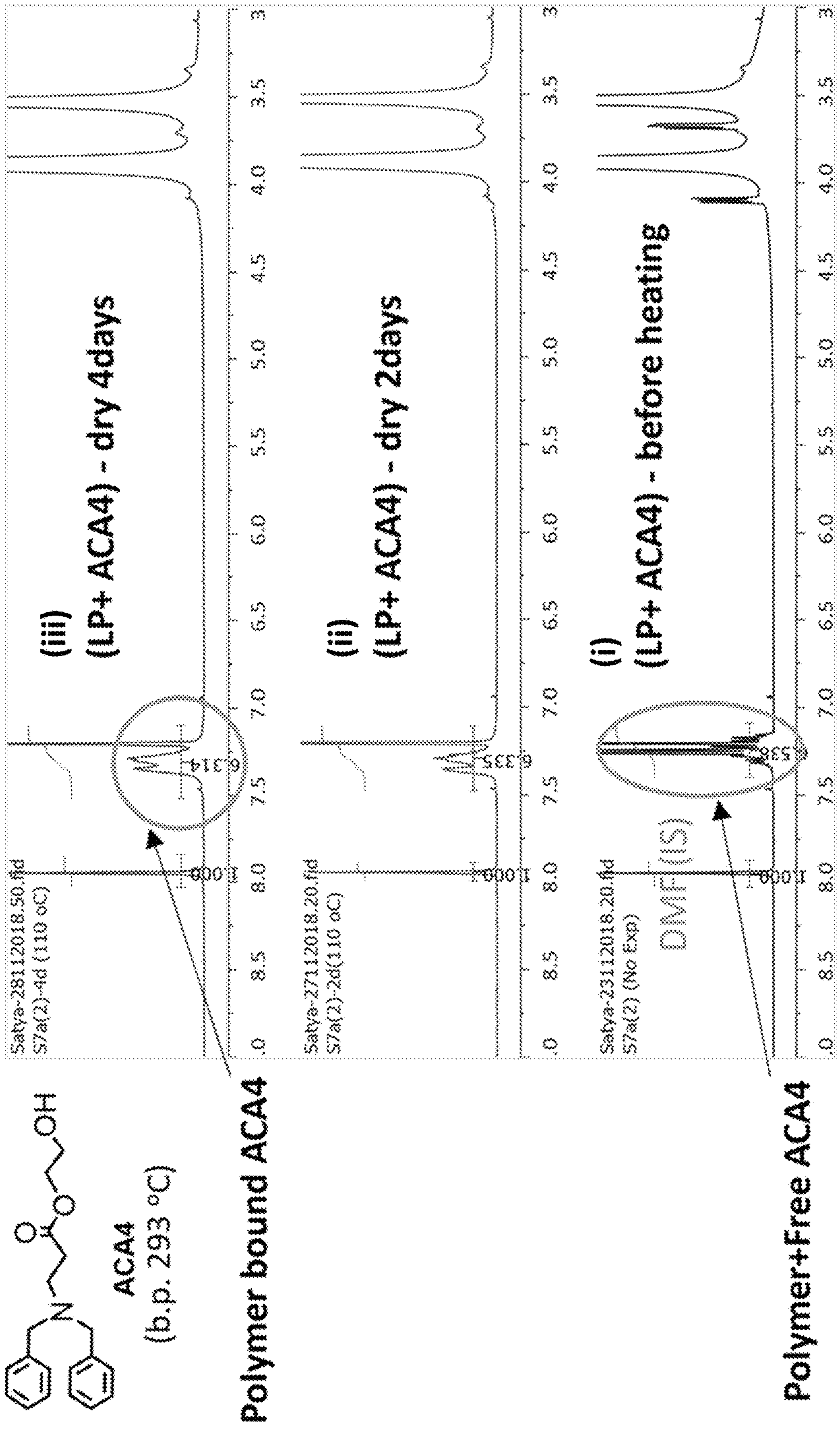
FIG. 7C shows $^1$H NMR spectra of a latex polymer (PMMA/PBMA/PMAA) in the presence of ACA4 (i) before heating; (ii) after drying/heating at 110° C. for 2 days; and (iii) after drying/heating at 110° C. for 4 days. ACA4 was still present and reacted (i.e. peak broadened) within the coating film even after heating.

The $^1H$ NMR results are presented in FIG. 7A to FIG. 7C. It can be clearly observed that PPH is completely evaporated out from the polymer after 2 days of heating (see FIG. 7B(ii)). However, ACA4 remain present even after 4 days of heating (see FIG. 7C(iii)) and is quantitative as polymer sample before heating (see FIG. 7C(i)). However, the most interesting result is the appearance of the aromatic peak belonging to ACA4, which became broader unlike the sharper appearance observed for the sample before heating. It is believed that the broader appearance of the ACA4 aromatic peaks signifies the stronger interaction in between ACA4 and polymer, which made the ACA4 as an integral part of the polymer. This confirmed the low volatility and reactivity of ACA4 and its application as reactive coalescing agents.

Figure 8:
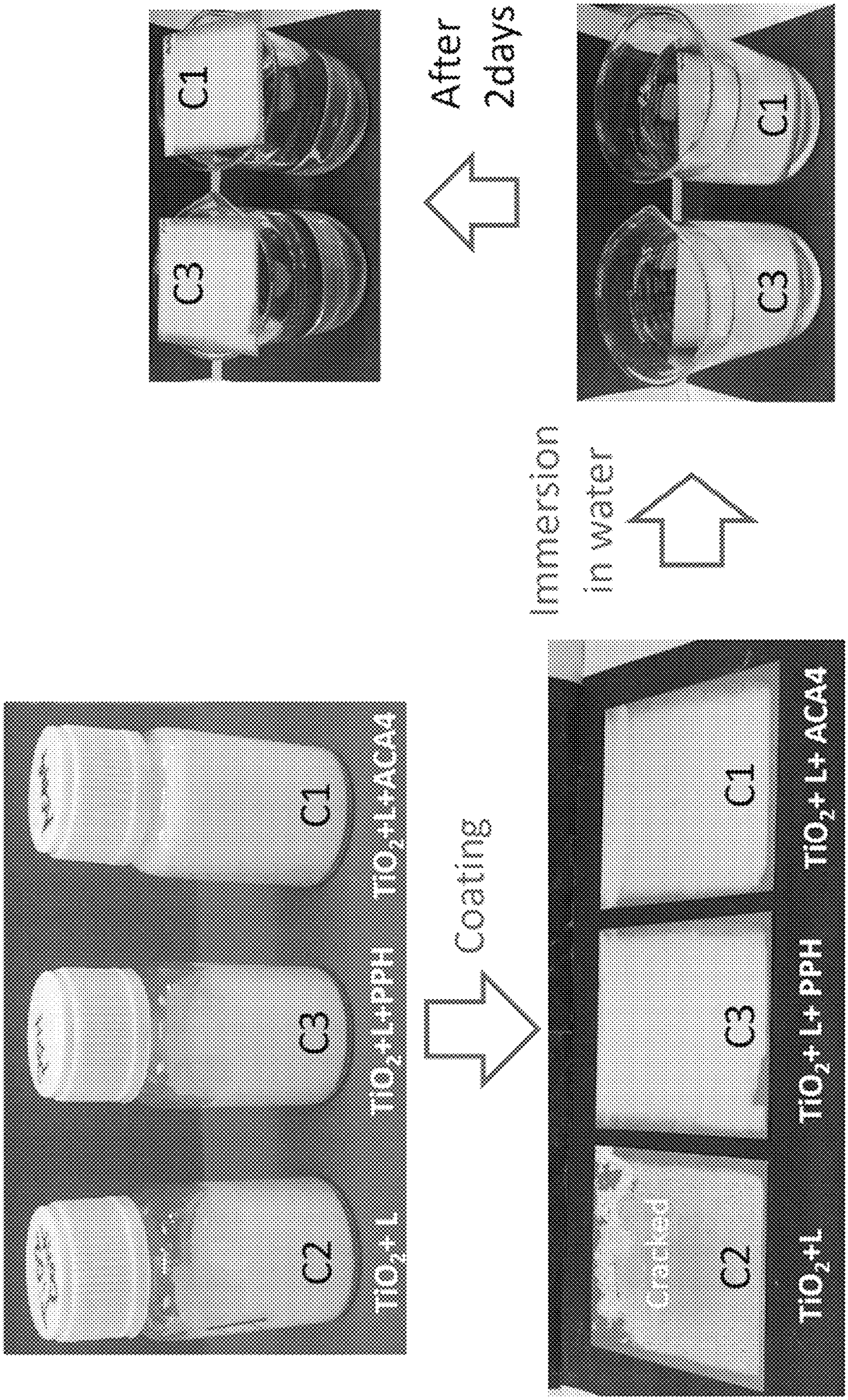
FIG. 8 shows photographs of basic coating formulations C1 to C3 taken respectively after film formation on metal plates and after immersion in water. C1 is a basic coating formulation prepared with coalescing agent ACA4. C2 and C3 are controls. C2 is a control formulation prepared without any coalescing agent and C3 is a control formulation prepared using a commercial coalescing agent PPH. Latex (L): YS800AP (BASF); MFFT 27.2° C.; $TiO_2$=~ 5 wt % in wet film=~10 wt % in dry film; PPH/ACA=2 wt % wet film; and $TiO_2$ dispersion: SC50% using BYK154; 0.25 g of $TiO_2$+5 g latex (SC 46.5%).

4.3. Formulation of Coating Using ACA4, $TiO_2$ and a Commercial Latex, Film Formation and Film Evaluation A basic coating formulation (see C1, FIG. 8) was developed using a commercial latex (YS800AP from BASF, MFFT 27.2° C.), $TiO_2$ (rutile, Tronox CR-826) (5 wt % in wet film) and ACA4 (2 wt %) using dispermat (Dispermat LC75-E). Two control formulations, first one, without using any coalescing agent (C2) and, second one, using a commercial coalescing agent PPH (2 wt %) (C3) were also produced in exactly the similar procedure as for ACA4. These coatings were then coated on metal plates, air dried and film formation was observed.

The following observations were noted for formulation C1 after coating:

No visible change of pH

No coloration and nice film formation

No stickiness

The formulation C2 cracked and did not make good film as expected (as MFFT is higher than RT), whereas formulation C1 produced uniform non tacky film similar to formulation C3. The coated films from C1 and C3 were then immersed in water for 2 days. Both the films did not show any evidence of delamination, dissolution, blistering and stickiness.

4.4. UV Exposure of C1 Formulation

A few microscopic glass slides were coated with C1 formulation (using ACA4) and dried at room temperature before exposing to high energy UV light (Omnicure S2000 with light guide, 250-450 nm, irradiance 50 $mW/cm^2$) for 100 hrs (equivalent to 56 day outdoor exposure considering 10 hrs of sunlight available each day).

Figure 9:
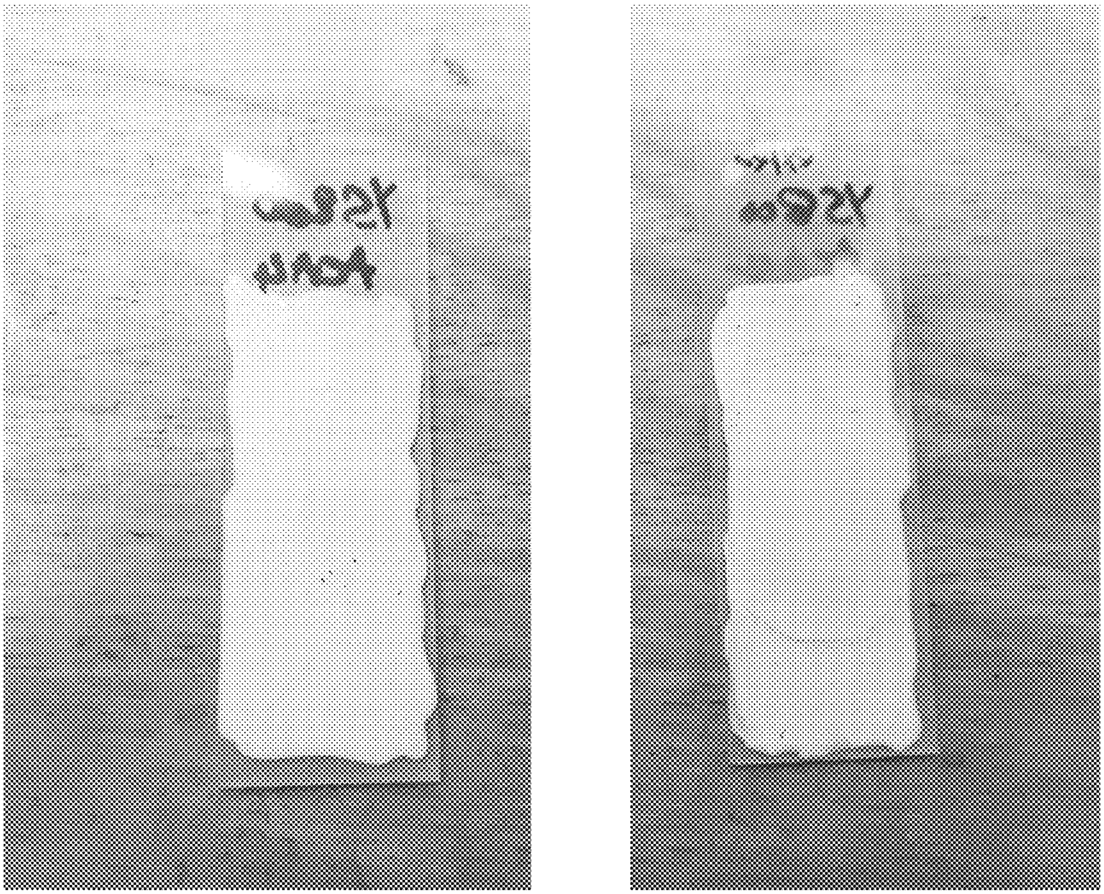
FIG. 9 shows photographs of microscopic glass slides coated with C1 formulation taken respectively (i) before UV exposure; and (ii) after 100 hours of UV exposure using Omnicure S2000. Irradiance=50 mW/m$^2$; Exposure time=100 hrs which is equivalent to 563 hrs continuous sunlight exposure, equivalent to 56 days (10 hrs/day).

No sign of discoloration or color development was observed as can be seen in the photographs shown in FIG. 9(*i*) and FIG. 9(*ii*).

4.5. Study of ACA4-COOH Interactions

ACA4-COOH interactions were studied with $^1H$ NMR and $^{13}C$ NMR spectroscopy using small molecules. In this study, methacrylic acid (MAA) was used.

Scheme 7. Interactions between amine group of ACA4 and COOH group of MAA

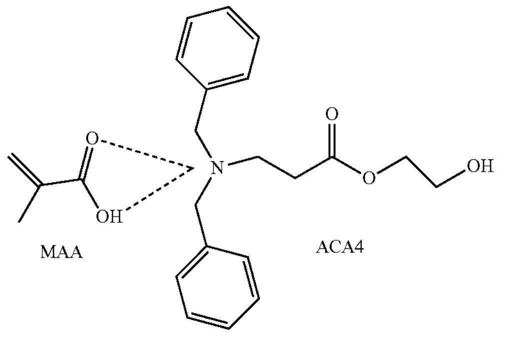

MAA ACA4

Figure 10:
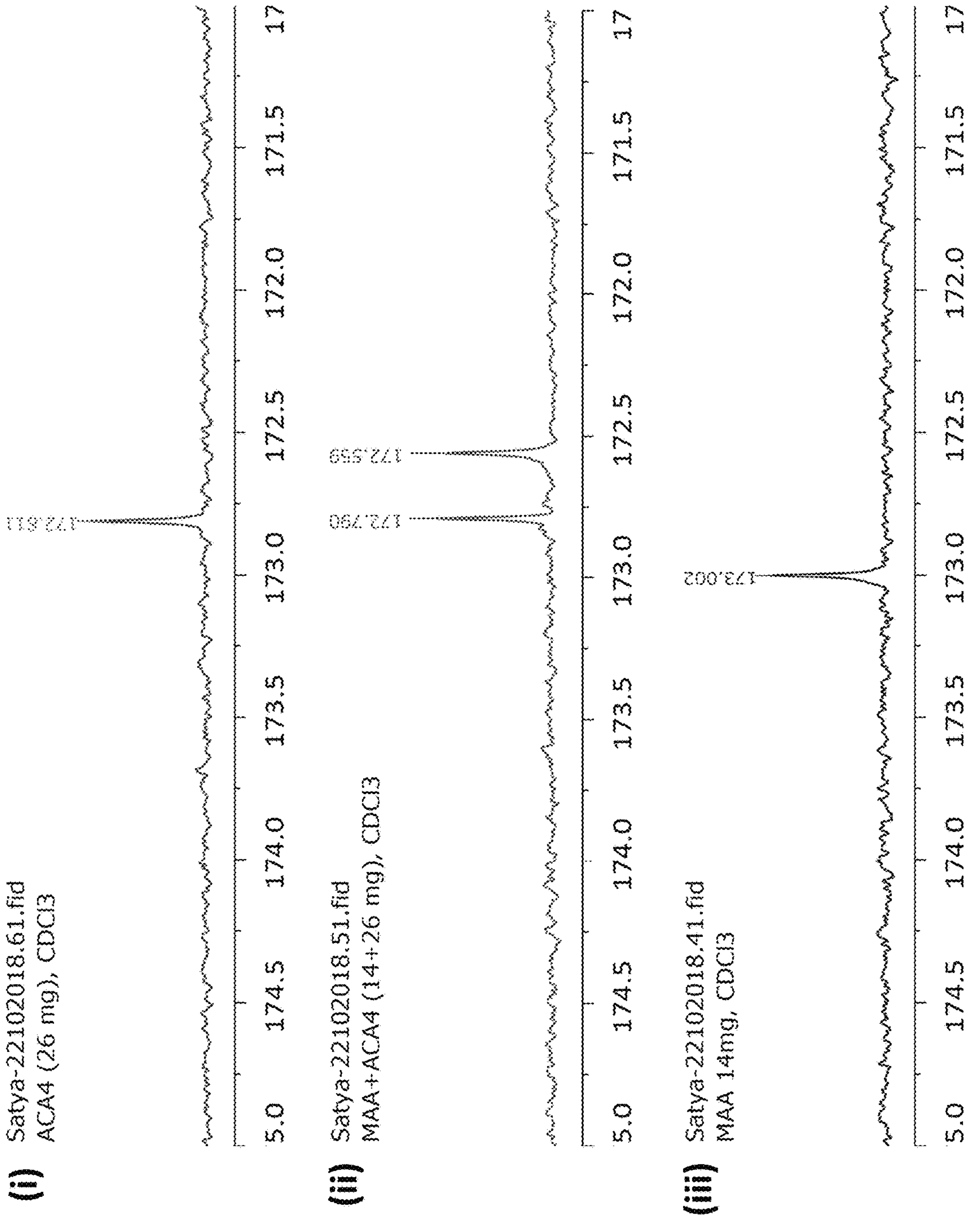
FIG. 10 shows $^{13}$C NMR spectra of (i) ACA; (ii) a mixture of ACA4 and methacrylic acid (MAA); and (iii) methacrylic acid (MAA). Acid-amine interaction was clearly observed as seen by shift of peak positions.

$^{13}C$ NMR spectra obtained for ACA4, MAA and a mixture of ACA4 and MAA are shown respectively in FIG. 10. Acid-amine interaction was clearly observed as seen by shift of peak positions.

4.6. Stabilization of Polymer by ACA4

Figure 11:
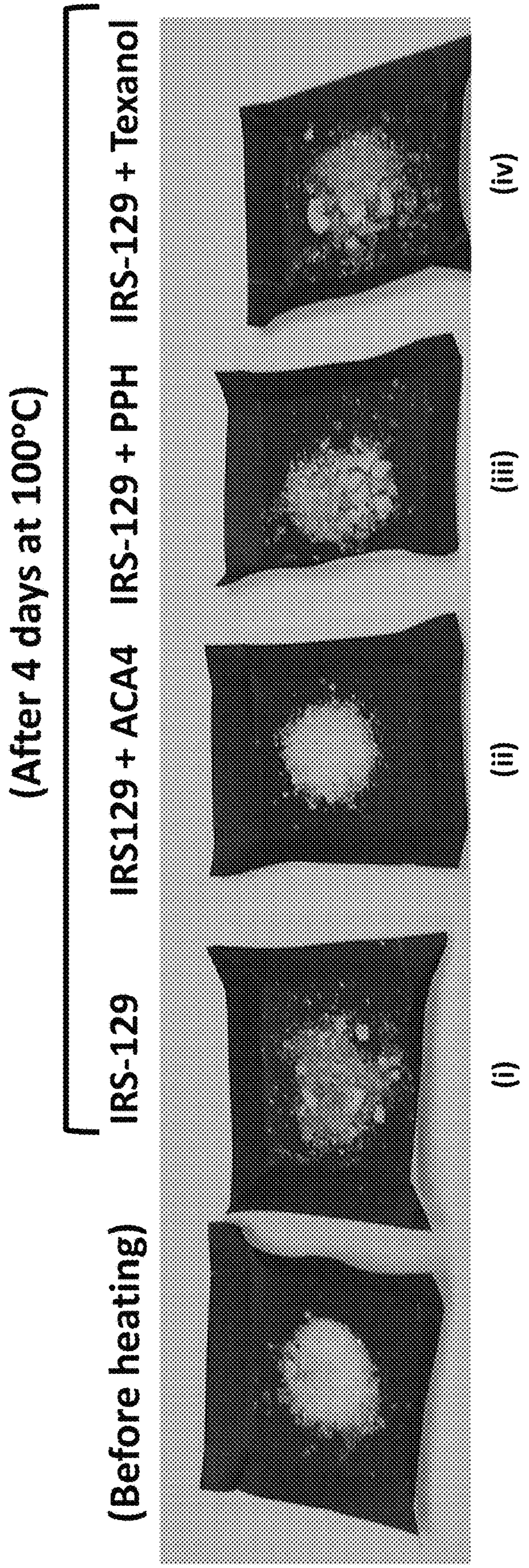
FIG. 11 shows a photograph of the latex polymer (acrylate latex IRS-129) taken before heating.

FIG. 11 shows a photograph of the latex polymer (acrylate latex IRS-129) taken before heating. FIG. 11 also shows photographs of the latex polymer (acrylate latex IRS-129) taken after heating at 100° C. for 4 days (i); when mixed with ACA4 (ii); when mixed with PPH (iii); and when mixed with texanol ester alcohol (iv).

As can be seen from the photographs obtained after heating, only photograph (iii) showed a stable sample, i.e. the same appearance as that of the original latex polymer captured prior to heating. Therefore, it can be concluded that ACA4 helps to stabilise or reduce oxidation/coloration of the polymer.

Example 5: Summary

The present disclosure provides coalescing agent for a coating formulation that is substantially free from volatile organic compounds (VOCs), a coating composition and a coating layer. Embodiments of the reactive coalescing agent, coating composition and coating layer disclosed herein possess one or more of the following properties/features:

(1) Color: Although the amine based coalescing agents disclosed herein are light yellow/brown in color, there is no coloration when prepared in solution or when formulated in coating.

(2) Basicity: As the amine content in the amine based coalescing agents disclosed herein is very low as compared to the overall size and molecular weight of the molecule, the amine based coalescing agents do not influence pH much. In fact, there is no change in pH when the amine based coalescing agents disclosed herein was formulated with the latex. It may be noted that waterborne latices have a basic pH of 8-9.

(3) Odor: No odor (4) Thermal Stability: Amine based coalescing agents disclosed herein even reduce discolouration of latex polymer (5) UV stability: Did not show any discoloration on UV exposure It will be appreciated by a person skilled in the art that other variations and/or modifications may be made to the embodiments disclosed herein without departing from the spirit or scope of the disclosure as broadly described. For example, in the description herein, features of different exemplary embodiments may be mixed, combined, interchanged, incorporated, adopted, modified, included etc. or the like across different exemplary embodiments. The present embodiments are, therefore, to be considered in all respects to be illustrative and not restrictive.

The invention claimed is:

1. A coalescing agent for a coating formulation that is substantially free from volatile organic compounds (VOCs), the coalescing agent comprising one or more amine compounds represented by general formula (I):

(I)

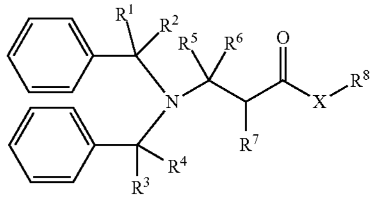

wherein

X is selected from O and NH;

$R^1$, $R^2$, $R^3$ and $R^4$ are each independently selected from the group consisting of H, alkyl and alkenyl;

$R^5$, $R^6$ and $R^7$ are H;

$R^8$ is selected from the group consisting of alkenyl, cycloalkyl, cycloalkenyl, hydroxyalkyl, alkyloxyalkyl, $(alkyloxy)_n$alkyl where n≥1, alkylacrylate, alkyl(meth)acrylate, alkylacrylamide, alkyl-$NR^xR^y$, and $(alkyloxy)_m$alkyl-O—C (═O)-alkyl-$NR^xR^y$ where m≥0 and where $R^x$ and $R^y$ are each independently selected from H, alkenyl, cycloalkyl, cycloalkenyl, aryl and alkylaryl, and wherein one or more of the H atoms is/are optionally replaced by hydroxy, alkoxy, hydroxyalkyl, halogen, haloalkyl, cyano, cyanoalkyl and nitro.

2. The coalescing agent of claim 1, wherein the amine compound has a boiling point that is more than about 250° C.

3. The coalescing agent of claim 1, wherein $R^1$, $R^2$, $R^3$ and $R^4$ are each independently selected from the group consisting of H, linear or branched $(C_1-C_{10})$-alkyl and linear or branched $(C_1-C_{10})$-alkenyl.

4. The coalescing agent of claim 1, wherein $R^8$ is selected from the group consisting of linear or branched $(C_2-C_{30})$-alkenyl, $(C_3-C_{30})$-cycloalkyl, $(C_3-C_{30})$-cycloalkenyl, linear or branched hydroxy-$(C_1-C_{30})$-alkyl, linear or branched $(C_1-C_{30})$-alkyl-oxy-$(C_1-C_{30})$-alkyl, linear or branched $[(C_1-C_{30})\text{-alkyl-oxy}]_n$-$(C_1-C_{30})$-alkyl where n≥1, $(C_1-C_{30})$-alkyl-acrylate, $(C_1-C_{30})$-alkyl-(meth)acrylate, $(C_1-C_{30})$-alkyl-acrylamide, linear or branched $(C_1-C_{30})$-alkyl-$NR^xR^y$, and $[(C_1-C_{30})\text{-alkyl-oxy})_m$-$(C_1-C_{30})$-alkyl-O—C (═C)—$(C_1$-

$C_{30}$)-alkyl-$NR^xR^y$ where m≥0, and where $R^x$ and $R^y$ are each independently selected from H, alkenyl, cycloalkyl, cycloalkenyl, aryl and alkylaryl.

5. The coalescing agent of claim 1, wherein $R^8$ is selected from the group consisting of:

—$R^9$—OH;

—$(R^{11}O)_n$—$R^{12}$;

—$R^{13}$—O—C(═O)—C($CH_3$)═$CH_2$;

—$R^{14}$(OH)—$R^{15}$—O—C (═O)—C($CH_3$)═$CH_2$;

—$R^{16}$—$NR^xR^Y$; and

—$(R^{17}$—$O)_m$—$R^{18}$—O—C (═O)—$R^{19}$—$NR^xR^y$, where n≥1, m≥0, $R^9$ and $R^{11}$ to $R^{19}$ are each alkyl, and where $R^x$ and $R^y$ are each independently selected from the group consisting of H, alkenyl, cycloalkyl, cycloalkenyl, aryl and alkylaryl.

6. The coalescing agent of claim 1, wherein $R^8$ is (i) hydroxyalkyl selected from the group consisting of hydroxymethyl, hydroxyethyl, 2-hydroxyethyl hydroxypropyl, 2-hydroxypropyl, hydroxybutyl, hydroxypentyl and hydroxyhexyl; (ii) $(alkyloxy)_n$alkyl selected from the group consisting of methoxymethyl, methoxyethyl, methoxypropyl, methoxybutyl, ethoxymethyl, ethoxyethyl, ethoxypropyl, ethoxybutyl, propoxymethyl, propoxyethyl, propoxypropyl, propoxybutyl, methoxymethoxymethyl, methoxymethoxyethyl, methoxymethoxypropyl, methoxymethoxybutyl, ethoxyethoxymethyl, ethoxyethoxyethyl, ethoxyethoxypropyl, ethoxyethoxybutyl, propoxypropoxymethyl, propoxypropoxyethyl, propoxypropoxypropyl, propoxypropoxybutyl, methoxymethoxymethoxymethyl, methoxymethoxymethoxyethyl, methoxymethoxymethoxypropyl, methoxymethoxymethoxybutyl, ethoxyethoxyethoxymethyl, ethoxyethoxyethoxyethyl, ethoxyethoxyethoxypropyl, ethoxyethoxyethoxybutyl, propoxypropoxypropoxymethyl, propoxypropoxypropoxyethyl, propoxypropoxypropoxypropyl and propoxypropoxypropoxybutyl; (iii) alkyl (meth) acrylate selected from the group consisting of methyl (meth) acrylate, ethyl (meth) acrylate, propyl (meth) acrylate, isopropyl (meth) acrylate, n-butyl (meth) acrylate, isobutyl (meth) acrylate, 3-methylbutyl (meth) acrylate, amyl (meth) acrylate, neopentyl (meth) acrylate, hexyl (meth) acrylate, cyclohexyl (meth) acrylate, heptyl (meth) acrylate, n-octyl (meth) acrylate, ethylhexyl (meth) acrylate and decyl (meth) acrylate; or (iv) alkyl (meth) acrylate substituted with hydroxy that is selected from the group consisting of hydroxymethyl (meth) acrylate, hydroxyethyl (meth) acrylate, hydroxypropyl (meth) acrylate and hydroxybutyl (meth) acrylate.

7. The coalescing agent of claim 1, wherein $R^1$, $R^2$, $R^3$ and $R^4$ are all H atoms.

8. The coalescing agent of claim 1, wherein the amine compound comprises more than twelve carbon atoms per basic nitrogen atom.

9. The coalescing agent of claim 1, wherein the coalescing agent spontaneously reacts with a polymer in a coating composition during/upon drying to form a coating layer.

10. The coalescing agent of claim 9, wherein the coalescing agent forms a chemical interaction with the polymer during/upon drying, wherein the chemical interaction is at least one of an ionic interaction or a covalent interaction.

11. The coalescing agent of claim 1, wherein the amine compound is selected from the group consisting of compounds (1), (2), (5), (6), (7), (8), (11) and (12):

(1)

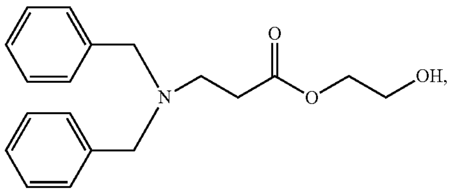

(2)

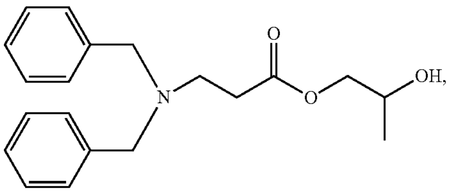

(5)

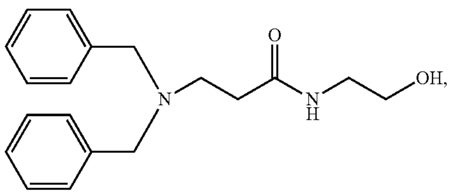

(6)

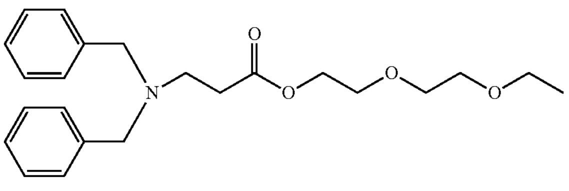

(7)

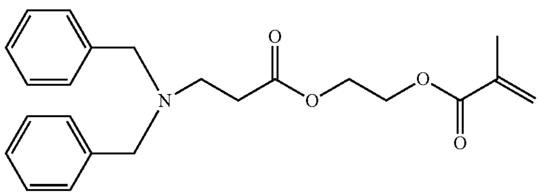

(8)

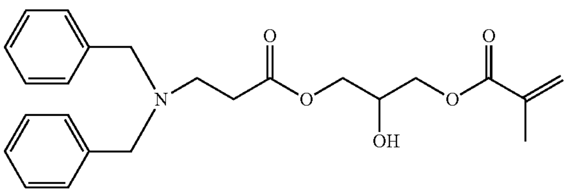

-continued (11)

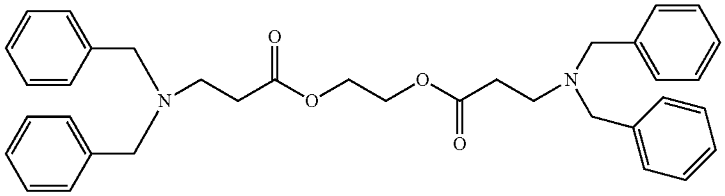

and (12)

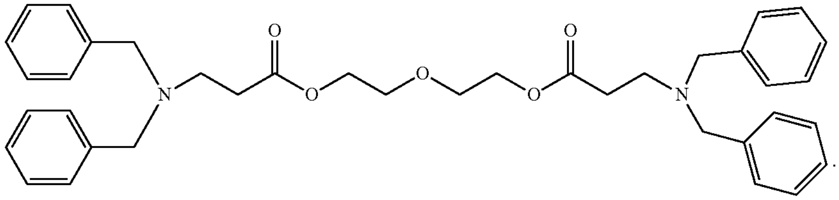

12. A coating composition comprising:

one or more coalescing agent(s); and one or more polymer(s), wherein the coalescing agent comprises one or more amine compounds represented by general formula (I):

(I)

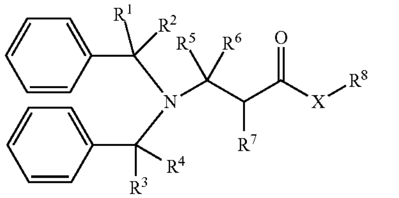

wherein

X is selected from O and NH;

$R^1$, $R^2$, $R^3$ and $R^4$ are each independently selected from the group consisting of H, alkyl and alkenyl;

$R^5$, $R^6$ and $R^7$ are H;

$R^8$ is selected from the group consisting of alkyl, alkenyl, cycloalkyl, cycloalkenyl, hydroxyalkyl, alkyloxyalkyl, $(alkyloxy)^n$alkyl where n≥1, alkylacrylate, alkyl(meth) acrylate, alkylacrylamide, alkylamine and $(alkyloxy)_m$alkyl-O—C (═O)-alkylamine where m≥0 and wherein one or more of the H atoms is/are optionally replaced by hydroxy, alkoxy, hydroxyalkyl, halogen, haloalkyl, cyano, cyanoalkyl and nitro, and wherein the polymer spontaneously reacts with the coalescing agent during/upon drying of the coating composition to form a coating layer.

13. The coating composition of claim 12, wherein the polymer comprises one or more acid group(s) and/or salts thereof selected from the group consisting of carboxylic acids (—C(═O) OH)), sulfonic acids (—S $(═O)_2OH$), phosphonic acids (—P(═O)$(OH)_2$), amine neutralized carboxylic acids, amine neutralized sulfonic acids, amine neutralized phosphonic acids, carboxylic acid-amine salts, sulfonic acid-amine salts and phosphonic acid-amine salts.

14. The coating composition of claim 13, wherein the carboxylic acids and derivatives thereof comprises acrylic acid and derivatives thereof; methacrylic acid and derivatives thereof; maleic acid and derivatives thereof; itaconic acid and derivatives thereof and combinations thereof.

15. The coating composition of claim 12, wherein the amount of the coalescing agent in the composition is from 0.2 wt % to 20.0 wt % of the composition.

16. The coating composition of claim 12, wherein the coating composition is substantially devoid of volatile organic compounds (VOCs).

17. The coating composition of claim 12, wherein the coating composition is a water-based coating composition.

18. The coating composition of claim 12, wherein the coating composition is a water-based paint coating composition.

19. A coating layer comprising one or more coalescing agent(s) chemically coupled to one or more polymer(s) via at least one of an ionic interaction or a covalent interaction with one or more groups of the polymer selected from the group consisting of carboxylic acids (—C(═O)OH)), sulfonic acids (—S$(═O)_2$OH), phosphonic acids (—P(═O)$(OH)_2$), amine neutralized carboxylic acids, amine neutralized sulfonic acids, amine neutralized phosphonic acids, carboxylic acid-amine salts, sulfonic acid-amine salts and phosphonic acid-amine salt, wherein the coalescing agent comprises one or more amine compounds represented by general formula (I):

(I)

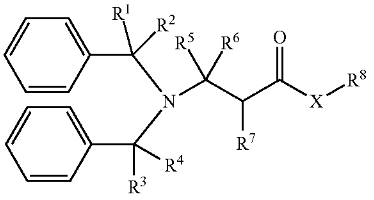

wherein

X is selected from O and NH;

$R^1$, $R^2$, $R^3$ and $R^4$ are each independently selected from the group consisting of H, alkyl and alkenyl;

$R^5$, $R^6$ and $R^7$ are H;

$R^8$ is selected from the group consisting of alkyl, alkenyl, cycloalkyl, cycloalkenyl, hydroxyalkyl, alkyloxyalkyl, $(alkyloxy)_n$alkyl where n≥1, alkylacrylate, alkyl(meth) acrylate, alkylacrylamide, alkylamine and $(alkyloxy)_m$alkyl-O—C(═O)-akylamine where m≥0 and wherein one or more of the H atoms is/are optionally replaced by hydroxy, alkoxy, hydroxyalkyl, halogen, haloalkyl, cyano, cyanoalkyl and nitro.

20. The coating layer of claim 19, wherein the layer has one or more of the following properties: odourless, non-tacky, non-sticky, substantially colourless in solution, substantially insoluble in water, substantially do not blister in water, substantially do not delaminate in water, chemically and/or physically stable, excellent resistance towards natural exposure/weathering and substantially inert towards ultra-violet (UV) light.

21. The coating composition of claim 12, wherein the amine compound is selected from the group consisting of compounds (1) to (12):

(1)

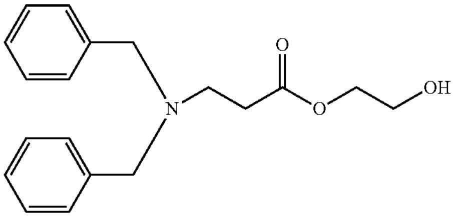

(2)

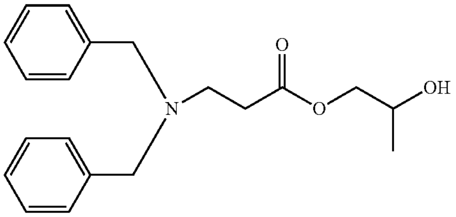

(3)

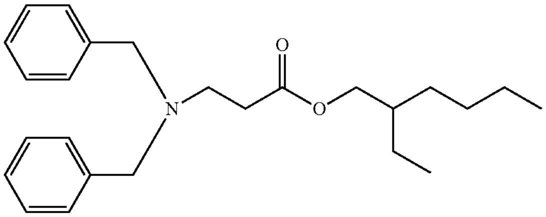

(4)

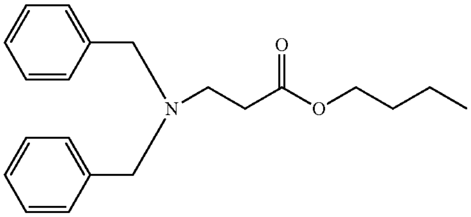

(5)

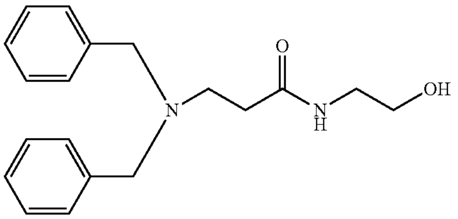

(6)

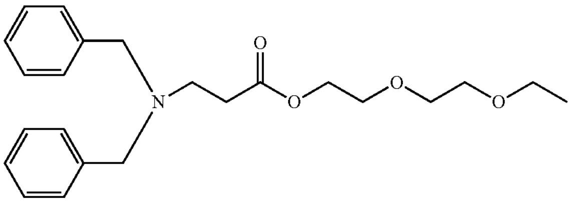

(7)

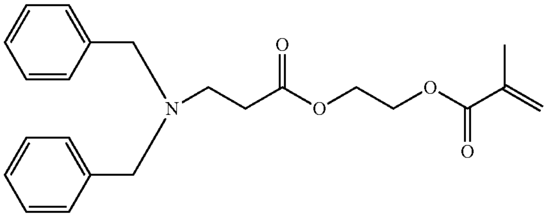

(8)

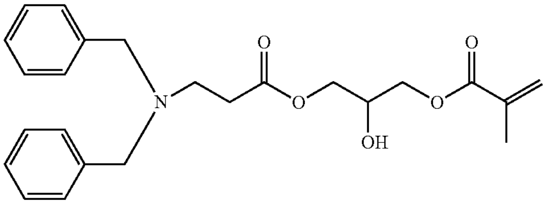

(9)

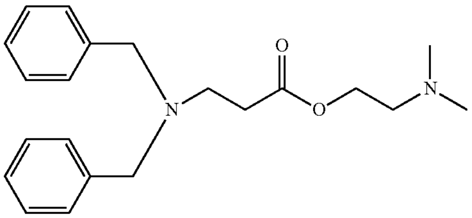

(10)

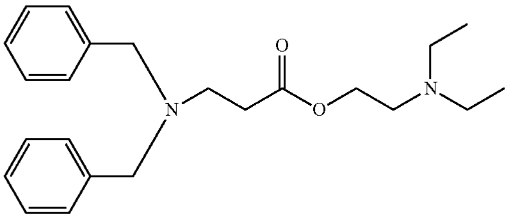

(11)

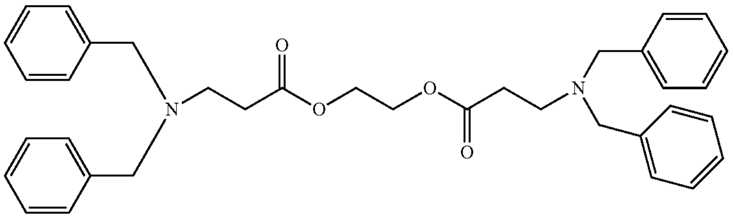

and

-continued
(12)
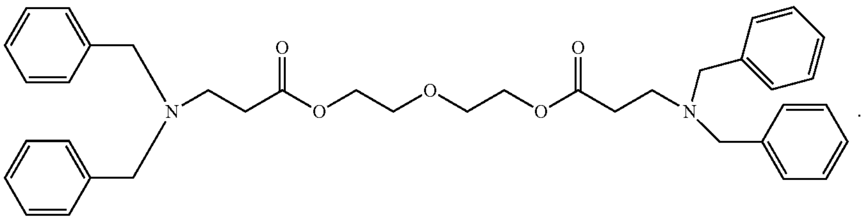
22. The coating layer of claim 19, wherein the amine compound is selected from the group consisting of compounds (1) to (12):
(1)
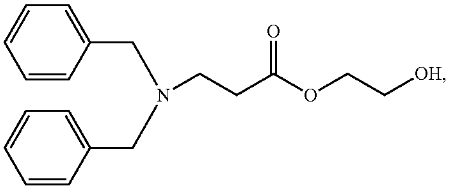
(2)
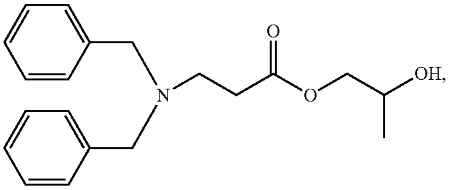
(3)
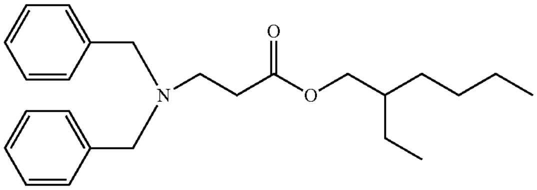
(4)
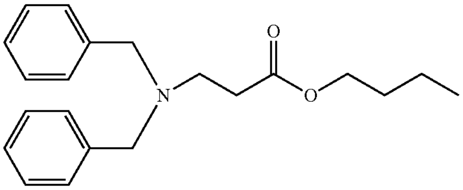
(5)
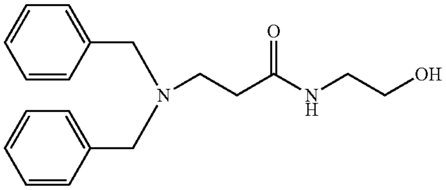
(6)
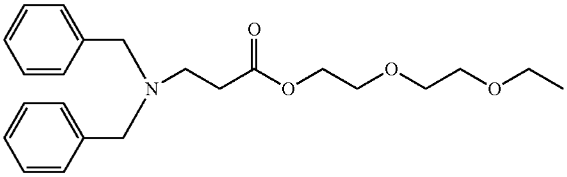
(7)
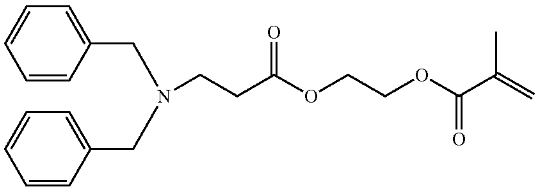
(8)
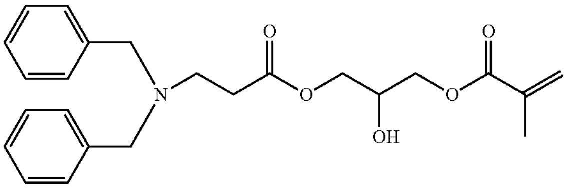
(9)
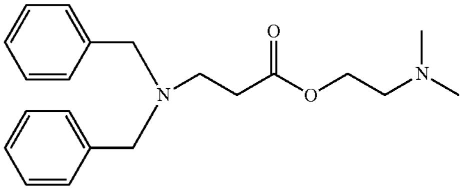
(10)
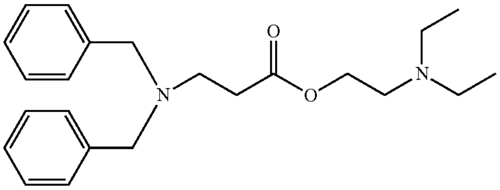

-continued
(11)
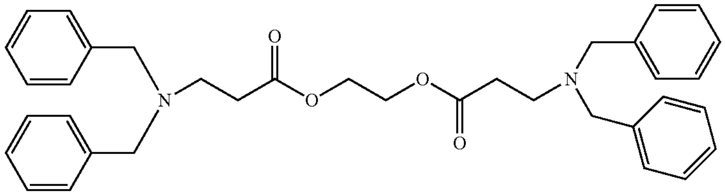
and
(12)
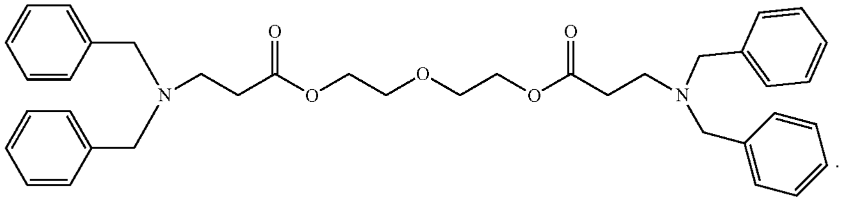
.
* * * * *